US012677303B2

(12) United States Patent
Adjakple et al.

(10) Patent No.: US 12,677,303 B2
(45) Date of Patent: Jul. 7, 2026

(54) 5G MULTICAST-BROADCAST SERVICES (MBS) SCHEDULING AND BEARER MANAGEMENT

(71) Applicant: INTERDIGITAL PATENT HOLDINGS, INC., Wilmington, DE (US)

(72) Inventors: Pascal Adjakple, Great Neck, NY (US); Rocco Di Girolamo, Laval (CA); Kyle Pan, Saint James, NY (US); Zhuo Chen, Claymont, DE (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 364 days.

(21) Appl. No.: 18/040,350

(22) PCT Filed: Aug. 5, 2021

(86) PCT No.: PCT/US2021/044791
§ 371 (c)(1),
(2) Date: Feb. 2, 2023

(87) PCT Pub. No.: WO2022/031996
PCT Pub. Date: Feb. 10, 2022

(65) Prior Publication Data
US 2023/0362960 A1 Nov. 9, 2023

Related U.S. Application Data

(60) Provisional application No. 63/094,685, filed on Oct. 21, 2020, provisional application No. 63/061,658, filed on Aug. 5, 2020.

(51) Int. Cl.
*H04W 72/30* (2023.01)
*H04W 72/231* (2023.01)

(52) U.S. Cl.
CPC ......... *H04W 72/30* (2023.01); *H04W 72/231* (2023.01)

(58) Field of Classification Search
CPC ..... H04W 72/30; H04W 72/231; H04W 4/08; H04W 4/40; H04W 76/40; H04W 48/12
See application file for complete search history.

(56) References Cited

U.S. PATENT DOCUMENTS 10,159,034 B2 12/2018 Koskinen
2005/0213583 A1* 9/2005 Lee ........................ H04W 72/23
370/395.5

(Continued)

OTHER PUBLICATIONS

RP-201038, Work Item on NR Multicast and Broadcast Services, 2020, 6 pages.

(Continued)

*Primary Examiner* — Nicholas A Jensen
*Assistant Examiner* — Ayodele Lawrence Olubodun
(74) *Attorney, Agent, or Firm* — Flaster Greenberg P.C.

(57) ABSTRACT

Methods are described for enabling 5G MBS operation. The disclosed methods overcome limitations in LTE and UTRAN MBMS operation, address the unique characteristic of 5G NR, and meet requirements of 5G MBS use cases. Disclosed are techniques for MCCH configuration procedures, including change notification procedures; triggers for MCCH acquisition; a RAN paging procedure for triggering counting for UEs in RRC INACTIVE; triggers for an MBS interest indication based on BWP switching; a timescale for scheduling of an MRB transport channel, a signal control channel, and a traffic channel; procedures for scheduling MCCH, including a scheduling configuration, an SCS, and a BWP; procedures for scheduling (P)TrCH; and procedures for scheduling MTCH.

20 Claims, 14 Drawing Sheets

(56) References Cited

U.S. PATENT DOCUMENTS

| | | | | |
|---|---|---|---|---|
| 2008/0259842 | A1* | 10/2008 | Cai | H04W 72/23 |
| | | | | 370/328 |
| 2010/0317283 | A1* | 12/2010 | Wu | H04W 72/30 |
| | | | | 455/3.06 |
| 2017/0164407 | A1* | 6/2017 | Yang | H04W 28/06 |
| 2017/0290014 | A1 | 10/2017 | Kim et al. | |
| 2017/0338971 | A1* | 11/2017 | Cai | H04L 12/1881 |
| 2018/0352387 | A1* | 12/2018 | Kim | H04W 48/12 |
| 2020/0045599 | A1* | 2/2020 | Bhardwaj | H04W 36/362 |
| 2022/0210614 | A1* | 6/2022 | Wang | H04W 4/50 |
| 2023/0171791 | A1* | 6/2023 | Fujishiro | H04W 76/40 |
| | | | | 370/312 |
| 2023/0231692 | A1* | 7/2023 | Baek | H04W 72/30 |
| | | | | 370/329 |

OTHER PUBLICATIONS

TR 23.757, Study on architectural enhancements for 5G multicast-broadcast services. V0.4.0, 2020, 157 pages.

TR 38.913, Study on scenarios and requirements for next generation access technologies, V15.0.0, 2018, 39 pages.

TS 22.261, Service requirements for the 5G system, V16.11.0, 2020, 72 pages.

TS 23.246, Multimedia Broadcast/Multicast Service (MBMS); Architecture and functional description, V15.1.0, 2019, 77 pages.

TS 36.300, Evolved Universal Terrestrial Radio Access (E-UTRA) and Evolved Universal Terrestrial Radio Access Network (E-UTRAN); Overall description; Stage 2, V15.10.0, 2020, 365 pages.

TS 36.331, Evolved Universal Terrestrial Radio Access (E-UTRA); Radio Resource Control (RRC); Protocol specification, V15.10.0, 2020, 965 pages.

TS 38.331, NR; Radio Resource Control (RRC); Protocol specification, V16.1.0, 2020, 906 pages.

\* cited by examiner

102

115/116/117

122

120
Transceiver

124
Speaker/
Microphone

126
Keypad

128
Display/
Touchpad/
Indicators

118
Processor

134
Power Source

136
GPS Chipset

138
Peripherals

130
Non-
Removable
Memory

132
Removable
Memory

5G MULTICAST-BROADCAST SERVICES (MBS) SCHEDULING AND BEARER MANAGEMENT

CROSS-REFERENCE TO RELATED APPLICATIONS

This application is the National Stage Application of International Patent Application No. PCT/US2021/044791, filed Aug. 5, 2021, which claims the benefit of U.S. Provisional Application No. 63/061,658, filed Aug. 5, 2020, entitled "5G Multicast-Broadcast Services (MBS) Scheduling and Bearer Management," and U.S. Provisional Application No. 63/094,685, filed Oct. 21, 2020, entitled "5G Multicast-Broadcast Services (MBS) Scheduling and Bearer Management," the contents of which are hereby incorporated by reference in their entirety.

BACKGROUND

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

SUMMARY

In an example, a method is provided that enables 5G MBS operation. According to some aspects, techniques are provided that overcome limitations that have been observed in LTE and UTRAN MBMS operation. For example, aspects may address the unique characteristic of 5G NR and meet the requirements set out by the envisioned 5G MBS use cases.

According to some aspects, MCCH configuration procedures are provided, e.g., change notification procedures. In some aspects, triggers for MCCH acquisition are provided. In another example, an RAN paging procedure for triggering counting for UEs in RRC_INACTIVE is provided. In another example, triggers for MBS interest indication based on BWP switching are provided. Further aspects may include a timescale for scheduling of MRB transport channel: radio frame, radio subframe, slot or mini-slot; a timescale for scheduling of the signal control channel: radio frame, radio subframe, slot or mini-slot; and a timescale for scheduling of the traffic channel: radio frame, radio subframe, slot or mini-slot. Furthermore, aspects may include procedures for scheduling MCCH, including configuration for MCCH scheduling, including SCS or BWP; procedures for scheduling (P)TrCH; and procedures for scheduling MTCH.

According to some aspects, a UE may use a 2-step based approach to obtain configuration information to allow it to receive an MBS service. For example, a UE interested in a first MBS service may determine an MCCH configuration information for MBS services and, based on the determination, read a first MCCH control information to determine MBS control information for the first MBS service. The UE may then, based on the MBS control information, receive the first MBS service.

According to some aspects, the MCCH configuration information may be carried in the broadcast system information, be included in a new SIB, be carried in one or more of a MAC CE or a physical layer DCI, include information about one or multiple MCCHs, and/or include one or more of the following: an MCCH scheduling information, a SCS, a BWP, a MCCH change notification indicator information, a carrier frequency, a PDCP configuration, an RLC configuration, a MAC configuration, a DRX configuration, a logical channel configuration. According to some aspects, the new SIB may have a validity area.

According to some aspects, the UE may monitor for an MCCH change notification, receive an MCCH change notification, and receive a second MCCH control information. For example, the reception of the second MCCH control information may overwrite the first stored MCCH control information. In some aspects, the MCCH change notification may be common to all MBS services, or may be common to a single MBS service, may be common to a group of MBS services. In some aspects, the MCCH change notification may be provided by reception of an MBS specific RNTI, the M-RNTI, on PDCCH. The MCCH change notification may indicate which MBS services are changing and/or which MCCH are changing. For example, the indication of which MCCH that is changing may be denoted by a bitmap. According to some aspects, the MCCH change notification may be transmitted periodically and/or may be provided on a dedicated RNTI per group of MBS services. According to some aspects, the UE may monitor the MCCH change notification in one or multiple MCCH change notification occasions. The UE may determine a first common notification occasion (e.g., where the first common notification occasion is determined based on the MCCH with the shortest modification period among the modification periods) and may determine a second common notification occasion (e.g., when service of interest changes or received service changes).

According to some aspects, the MCCH configuration may assume a single MCCH with multiple repetition periods. For example, the MCCH configuration information may contain one or more MCCH information change notification configuration parameter sets, e.g., one for each service or group of services. Moreover, the MCCH information change notification configurations parameter set may include a MCCH modification cycle and MCCH repetition cycles.

According to some aspects, the UE may autonomously acquire MCCH control information. For example, the UE may further trigger an MCCH acquisition during one or more of the following conditions: change of configuration to BWPs into the UE, switching of active BWP, and/or UE enters a new RAN xcast area.

According to some aspects, the MBS control information may include one or more of the following: an MBS scheduling information, an MBS session information (e.g. TMGI), an SCS, a BWP, a repetition information, a DRX configuration, a carrier frequency, a PDCP configuration, an RLC configuration, a MAC configuration, a logical channel configuration, an RNTI, and/or a neighbour cell list.

According to some aspects, the UE may trigger an MRB establishment when one or more of the following conditions occur: upon start of the MBS session, upon (re-)entry of the corresponding xcast service area, upon becoming interested in the MBS service, upon removal of UE capability limitations inhibiting reception of the concerned service, and/or upon BWP switching, e.g., a new bearer may be configured with configuration associated with this BWP (and the old bearer configuration may be released). According to some aspects, the UE may further trigger release of an MRB upon BWP switching, e.g., the bearer configuration associated with the old BWP may be released. In some aspects, upon MRB release, the UE may release the SDAP entity, the PDCP entity, and/or the RLC entity as well as the related MAC and physical layer configuration. Moreover, the UE may inform upper layers about the release of the MRB by indicating the corresponding TMGI and MBS session identifier.

According to some aspects, the UE may further receive a paging message with an indication that paging is for a counting request. For example, the counting request may include a list of MBS services for which count is requested and/or the paging message may be transmitted over a common paging occasion. In some aspects, the UE may send a counting response message in the paging response.

According to some aspects, the UE may send an MBS interest indication to the serving cell. For example, a BWP switch may trigger the UE to send the MBS interest indication. In some aspects, the MBS interest indication may include a priority of MBS reception versus unicast reception. Moreover, the UE may determine the MBS frequency of interest based on the BWP configuration of the MBS service.

According to some aspects, timing information included in the MCCH control information and the MBS control information may be frame based, slot based, mini-slot based, and/or symbol based. Moreover, the MCCH control information may be carried on a first BWP and the MBS service may be carried on a second BWP.

According to some aspects, the MBS scheduling information may be provided to the UE through system information, MAC CE, or PHY DCI. Moreover, in some aspects, a gNB may broadcast multiple MCCH, e.g., one for each group of MBS services.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION

Figure 1A:
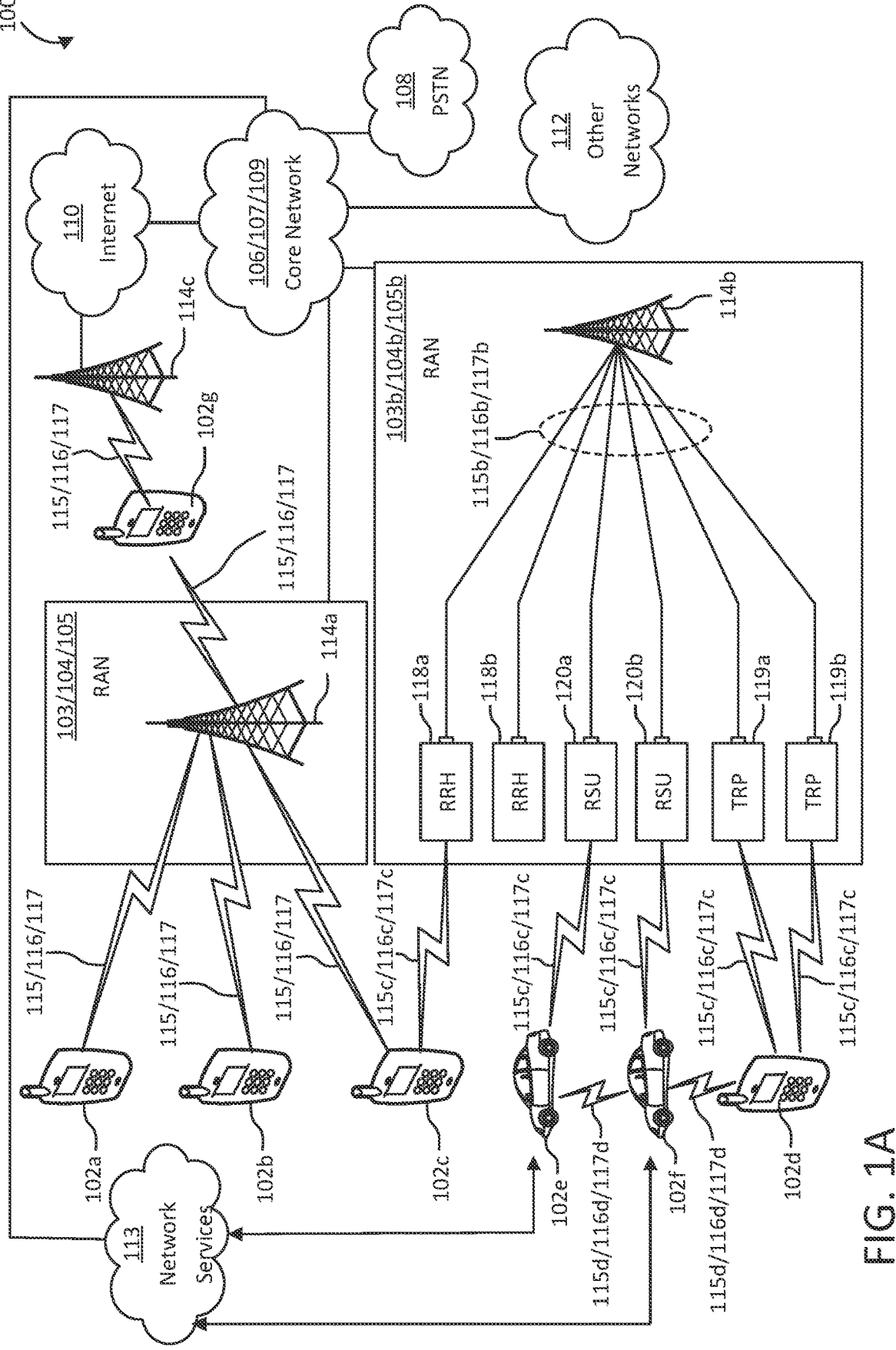
FIG. 1A illustrates an example communications system.

Table 1 describes some of the abbreviations used herein.

TABLE 1

| Abbreviations | |
| --- | --- |
| 3GPP | $3^{rd}$ Generation Partnership Project |
| 5G | 5th Generation |
| 5GS | 5G System |
| AMF | Access and Mobility Management Function |
| ARQ | Automatic Repeat Request |
| BM-SC | Broadcast Multicast Service Center |
| BWP | Bandwidth Part |
| CFI | Control Format Indicator |
| CP | Cyclic Prefix |
| CN | Core Network |
| CU | Central Unit |
| CU-RXA | Central Unit RXA |
| DCI | Downlink Control Information |
| DL-SCH | Downlink Shared Channel |
| DRX | Discontinuous Reception |
| DU | Distributed Unit |
| DU-RXA | Distributed Unit RXA |
| eNB | enhanced Node B |
| EN TV | Enhanced Television |
| EPS | Evolved Packet System |
| E-UTRA | Evolved UMTS Terrestrial Radio Access |
| eMBMS | Enhanced MBMS |
| FeMBMS | Further enhancements MBMS |

TABLE 1-continued

| Abbreviations | |
|---|---|
| FR2 | Frequency Range 2 (frequency bands from 24.25 GHz to 52.6 GHz) |
| FDD | Frequency-Division Duplexing |
| gNB | 5G Node B |
| GPRS | General Packet Radio Service |
| G-RNTI | Group RNTI |
| GW | Gateway |
| HARQ | Hybrid ARQ |
| ID | Identity |
| IE | Information Element |
| IoT | Internet of Things |
| ITS | Intelligent Transport System |
| LTE | Long Term Evolution |
| MAC | Media/Medium Access Control |
| MBMS | Multimedia Broadcast Multicast services |
| MBMS GW | MBMS Gateway |
| MBS | Multicast/Broadcast Service |
| MBS GW | Multicast/Broadcast Service GW |
| MBSFN | Multicast-broadcast single-frequency network |
| MCCH | Multicast Control Channel |
| MCE | Multi-cell/multicast coordination entity |
| MCH | Multicast transport channel |
| MCMF-MCCH | Multi-Cell Multi-Frequency MCCH |
| MCMF-MTCH | Multi-Cell Multi-Frequency MTCH |
| MCSF-MCCH | Multi-Cell Single-Frequency MCCH |
| MCSF-MTCH | Multi-Cell Single -Frequency MTCH |
| MC-PTM | Multi-Cell PTM |
| MC-RXA | Multi-Cell RXA |
| MCS | Modulation and Coding Scheme |
| MIMO | Multiple Input Multiple Output |
| MooD | MBMS operation on Demand |
| MRB | Multicast/Broadcast Radio Bearer |
| MTCH | Multicast Traffic Channel |
| NAS | Non-Access Stratum |
| OFDM | Orthogonal Frequency Division Multiplexing |
| PDCCH | Physical Downlink Control Channel |
| PDCP | Packet Data Convergence Protocol |
| PDSCH | Physical Downlink Shared Channel |
| PMCH | Physical Multicast Channel |
| PSM | Power Save Mode |
| PTP | Point-to-Point |
| (P)TrCH | Physical/Transport Channel |
| QoS | Point-to-Multipoint |
| RAN | Radio Access Network |
| RLC | Radio Link Control |
| ROM | Receive-only-Mode |
| RNL | Radio Network Layer |
| RNTI | Radio Network Temporary Identifier |
| RSRP | Reference signal received power |
| RSRQ | Reference Signal Received Quality |
| RXA | RAN Xcast Area |
| SC-MCCH | Single Cell MCCH |
| SC-MTCH | Single Cell MCTH |
| SC-PTP | Single Cell PTP |
| SC-PTM | Single Cell PTM |
| SC-RNTI | Single Cell RNTI |
| SC-RXA | Single Cell RXA |
| SCS | Service Capability Server |
| SDAP | Service Data Adaptation Protocol |
| SFN | Single Frequency Network |
| SFN | System Frame Number |
| SIM | Subscriber Identity Module |
| SINR | Signal-to-noise and INterference Ratio |
| STMGI | Super TMGI |
| STU | System Time Unit |
| STUN | System Time Unit Number |
| TBS | Transport Block Size |
| TDM | Time Division Multiplexing |
| TMGI | Temporary Mobile Group Identity |
| TNL | Transport Network Layer |
| UE | User Equipment |
| UL | Uplink |
| UM | Unacknowledged Mode |
| UPF | User Plane Function |
| V2X | Vehicle to Anything |

Terms and Definitions

The following is a list of terms that may appear in the following description. Unless otherwise specified, the terms used herein are defined as follows.

Multicast Service—A unidirectional point-to-multipoint service in which data may be transmitted from a single source to a multicast group in an associated multicast service area. A multicast service may be received by users that are subscribed to the multicast service and have joined the multicast group associated with the multicast service.

Broadcast Service—A unidirectional point-to-multipoint service in which data may be transmitted from a single source to multiple UEs in the associated broadcast service area. A broadcast service may be received by users who have enabled the broadcast service locally on their UE and who are in the broadcast area defined for the broadcast service.

Service Continuity in relation to MBS—Service Continuity may imply that the UE would continue to receive (with no or little service interruption) an MBS service despite changing serving cell, changing RRC state, or changing RAN delivery method for the MBS service.

Single Frequency Network—A set of cells operating on the same frequency. In the context of MBMS, it may further imply that the transmissions from all the cells are synchronized and use the same transmission format (e.g., MCS, TBS).

PTP—A term used in a radio access network to denote a case in which the over the air transmissions are from a single RAN node to a single UE.

PTM—A term used in a radio access network to denote a case in which the over-the-air transmissions are from a single RAN node to multiple UEs. PTM transmissions from multiple cells may be combined to create a Multi-Cell PTM transmission MBS transmission area—A transmission area over which an MBS service may be offered.

RAN delivery method—A method by which a RAN node may transmit the MBS traffic over the Uu interface. A RAN delivery method may be of unicast radio bearer type or MBS radio bearer (MRB) type.

A RAN Xcast Area (RXA)—a grouping of one or more cells that may provide an MBS service, or group of MBS services, through one or more RAN delivery methods that are known to the UE, or may be determined by the UE. In other words, a UE receiving an MBS service (or group of MBS services) in one cell of an RXA, will also know how to receive the same MBS service (or group of MBS services) in another cell of the RXA. An Xcast area used for a broadcast service may also be referred to as broadcast service area. An Xcast area used for a multicast service may also be referred to as multicast service area.

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
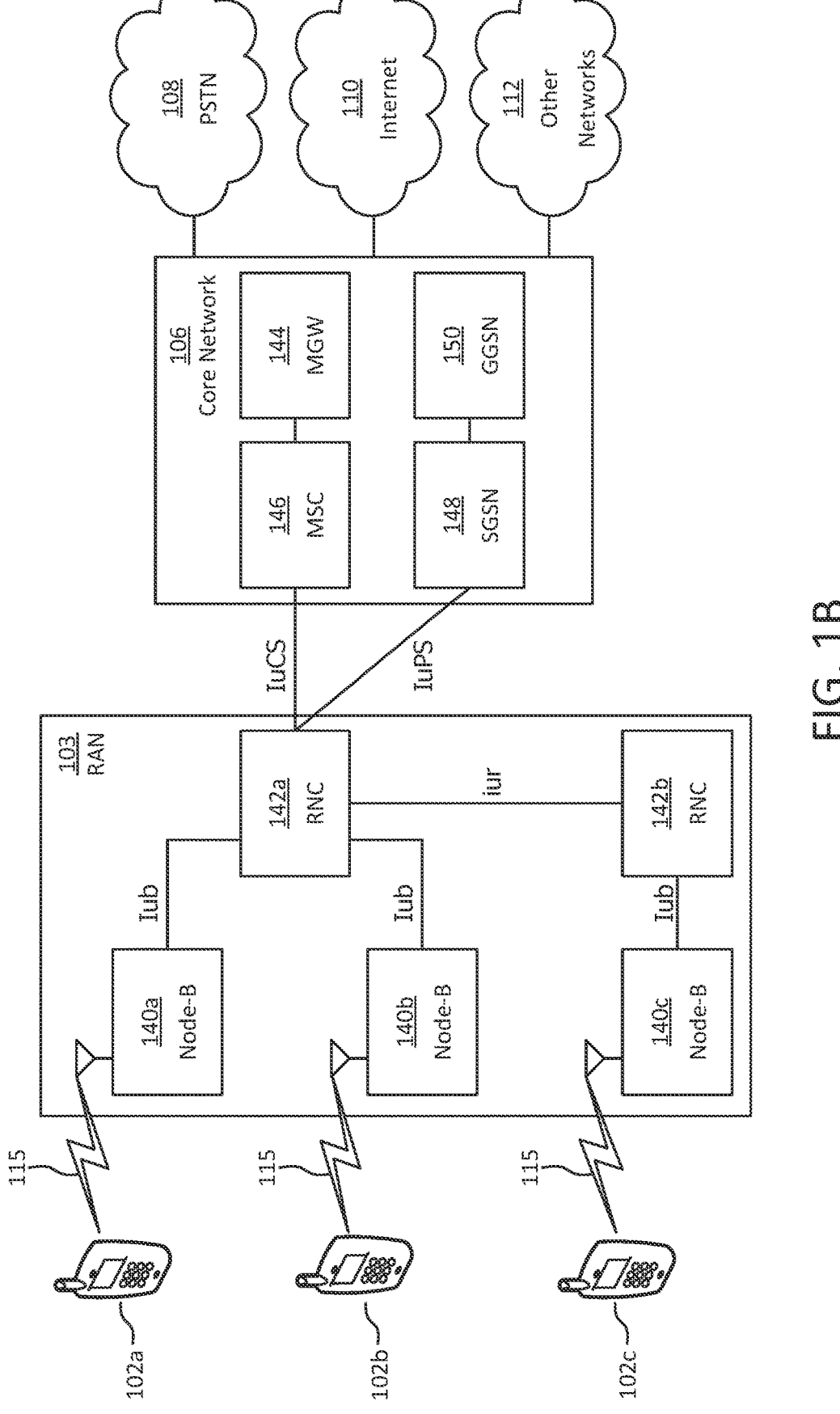
FIGS. 1B, 1C, and 1D are system diagrams of example RANs and core networks.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, and 102*c* with access to circuit-switched networks, such as the PSTN 108, to facilitate communications between the WTRUs 102*a*, 102*b*, and 102*c*, and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, and 102*c* with access to packet-switched networks, such as the Internet 110, to facilitate communications between and the WTRUs 102*a*, 102*b*, and 102*c*, and IP-enabled devices.

The core network 106 may also be connected to the other networks 112, which may include other wired or wireless networks that are owned and/or operated by other service providers.

Figure 1C:
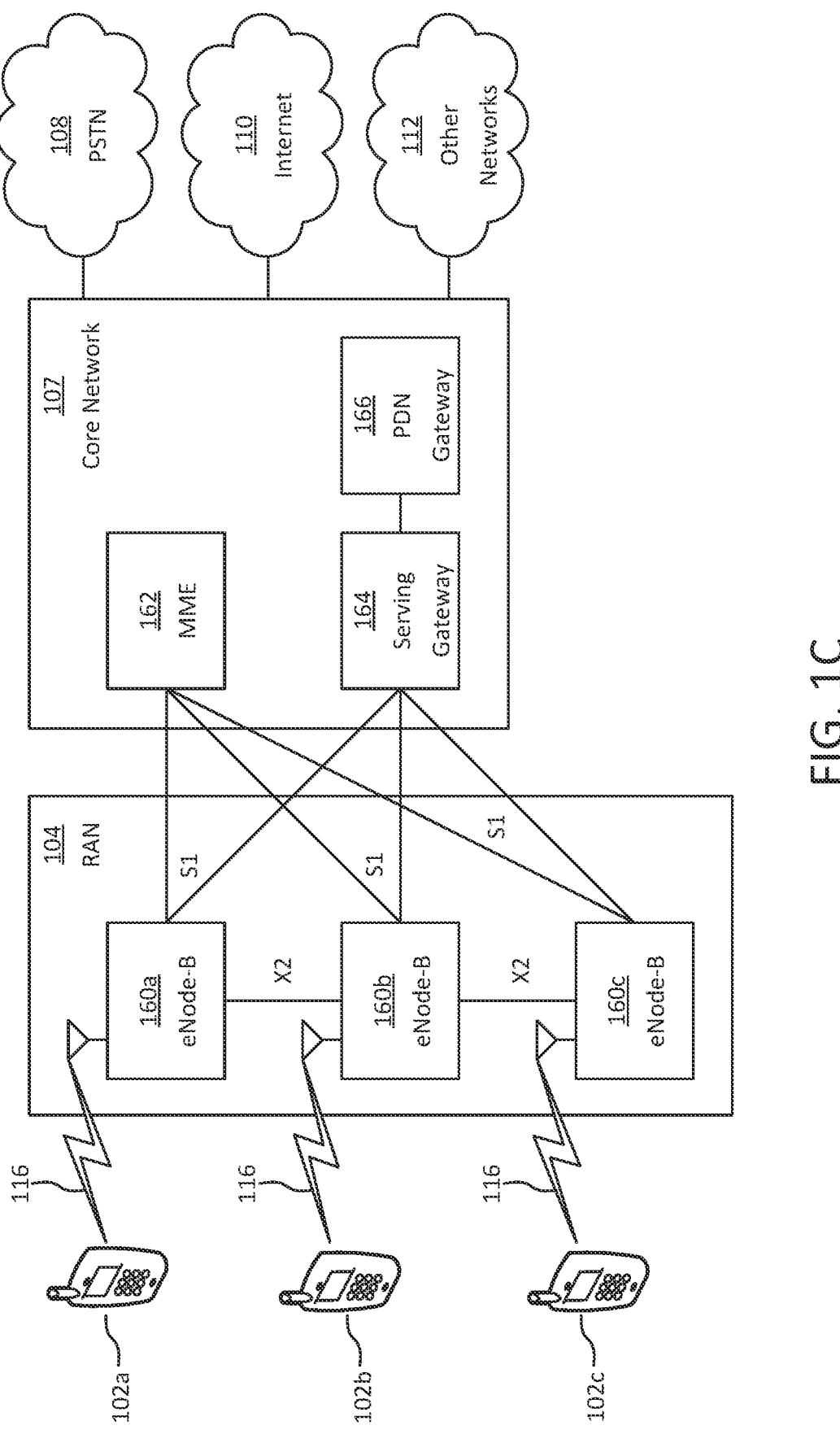

FIG. 1C is a system diagram of an example RAN 104 and core network 107. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, and 160*c*, though it will be appreciated that the RAN 104 may include any number of eNode-Bs. The eNode-Bs 160*a*, 160*b*, and 160*c* may each include one or more transceivers for communicating with the WTRUs 102*a*, 102*b*, and 102*c* over the air interface 116. For example, the eNode-Bs 160*a*, 160*b*, and 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 1C, the eNode-Bs 160*a*, 160*b*, and 160*c* may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, and 102*c*, bearer activation/deactivation, selecting a particular serving gateway during an initial attach of the WTRUs 102*a*, 102*b*, and 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, and 102*c*. The serving gateway 164 may also perform other functions, such as anchoring user planes during inter-eNode B handovers, triggering paging when downlink data is available for the WTRUs 102*a*, 102*b*, and 102*c*, managing and storing contexts of the WTRUs 102*a*, 102*b*, and 102*c*, and the like.

The serving gateway 164 may also be connected to the PDN gateway 166, which may provide the WTRUs 102*a*, 102*b*, and 102*c* with access to packet-switched networks, such as the Internet 110, to facilitate communications between the WTRUs 102*a*, 102*b*, 102*c*, and IP-enabled devices.

The core network 107 may facilitate communications with other networks. For example, the core network 107 may provide the WTRUs 102*a*, 102*b*, and 102*c* with access to circuit-switched networks, such as the PSTN 108, to facilitate communications between the WTRUs 102*a*, 102*b*, and 102*c* and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102*a*, 102*b*, and 102*c* with access to the networks 112, which may include other wired or wireless networks that are owned and/or operated by other service providers.

Figure 1D:
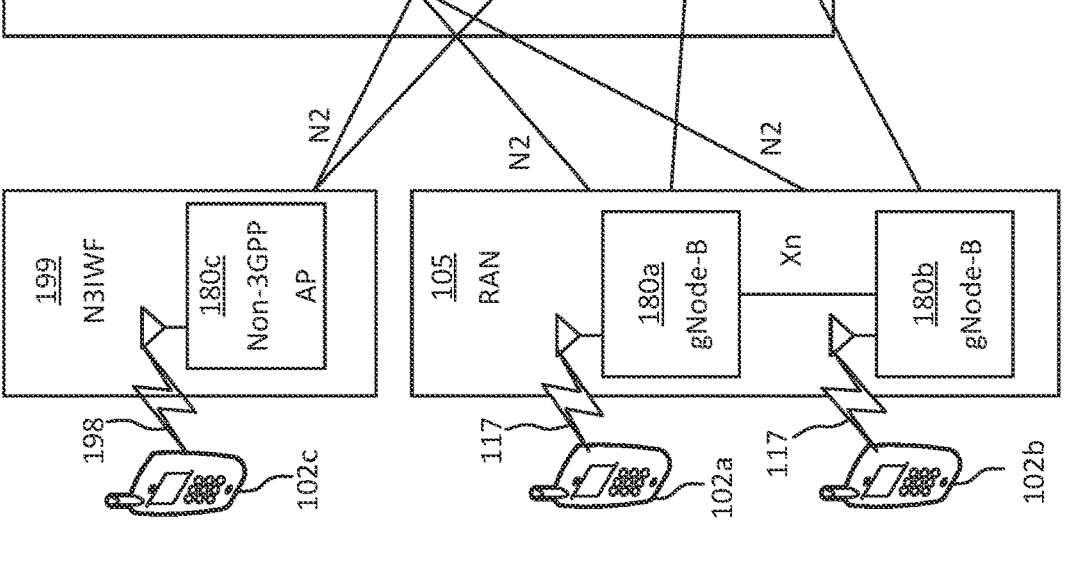

FIG. 1D is a system diagram of an example RAN 105 and core network 109. The RAN 105 may employ an NR radio technology to communicate with the WTRUs 102*a* and 102*b* over the air interface 117. The RAN 105 may also be in communication with the core network 109. A Non-3GPP Interworking Function (N3IWF) 199 may employ a non-3GPP radio technology to communicate with the WTRU 102*c* over the air interface 198. The N3IWF 199 may also be in communication with the core network 109.

The RAN 105 may include gNode-Bs 180*a* and 180*b*. It will be appreciated that the RAN 105 may include any number of gNode-Bs. The gNode-Bs 180*a* and 180*b* may each include one or more transceivers for communicating with the WTRUs 102*a* and 102*b* over the air interface 117. When integrated access and backhaul connection are used, the same air interface may be used between the WTRUs and gNode-Bs, which may be the core network 109 via one or multiple gNBs. The gNode-Bs 180*a* and 180*b* may implement MIMO, MU-MIMO, and/or digital beamforming technology. Thus, the gNode-B 180*a*, for example, may use multiple antennas to transmit wireless signals to, and receive wireless signals from, the WTRU 102*a*. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180*c*. It will be appreciated that the N3IWF 199 may include any number of non-3GPP Access Points. The non-3GPP Access Point 180*c* may include one or more transceivers for communicating with the WTRUs 102*c* over the air interface 198. The non-3GPP Access Point 180*c* may use the 802.11 protocol to communicate with the WTRU 102*c* over the air interface 198.

Each of the gNode-Bs 180*a* and 180*b* may be associated with a particular cell (not shown) and may be configured to handle radio resource management decisions, handover decisions, scheduling of users in the uplink and/or downlink, and the like. As shown in FIG. 1D, the gNode-Bs 180*a* and 180*b* may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
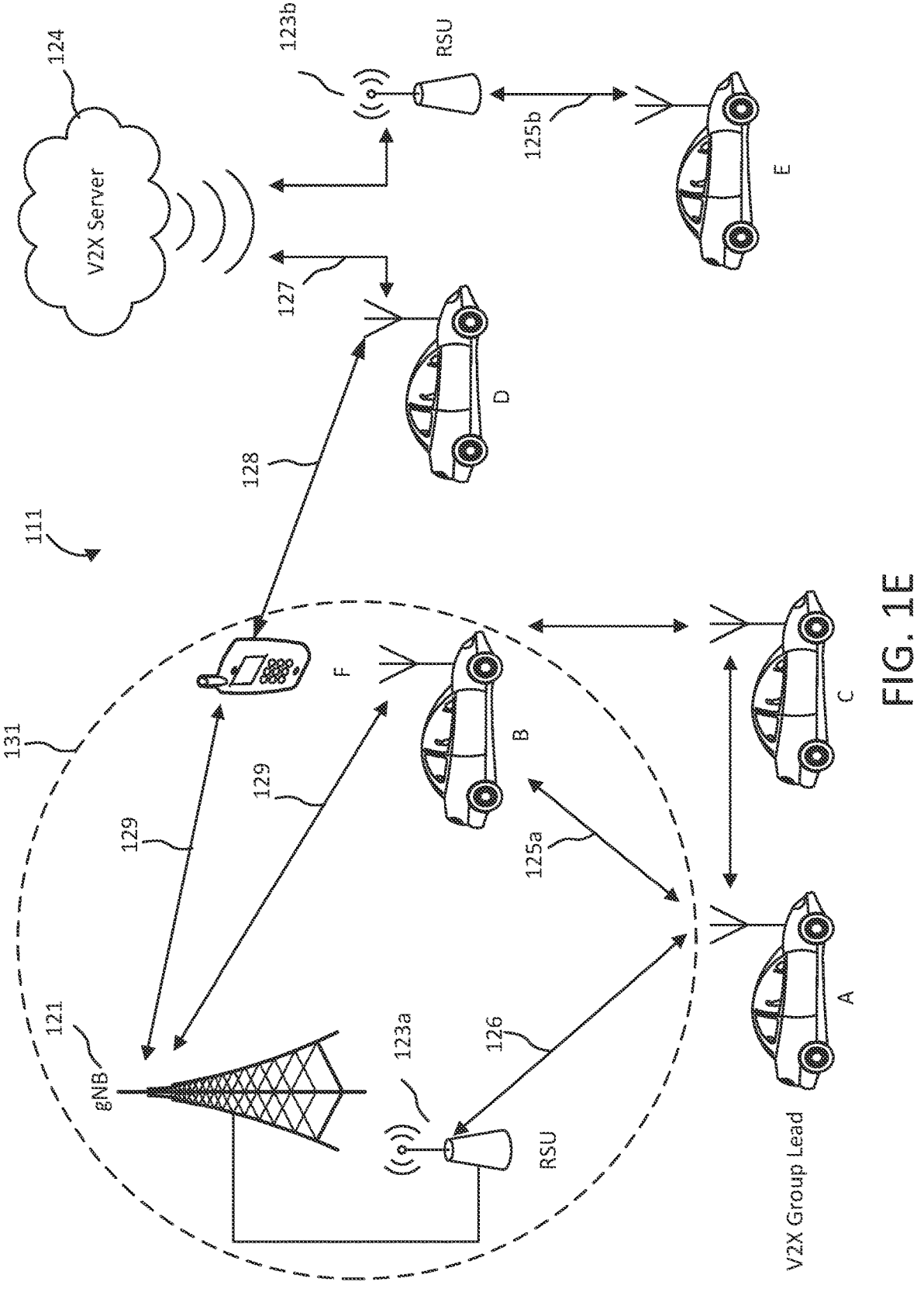
FIG. 1E illustrates another example communications system.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 1E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 1E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
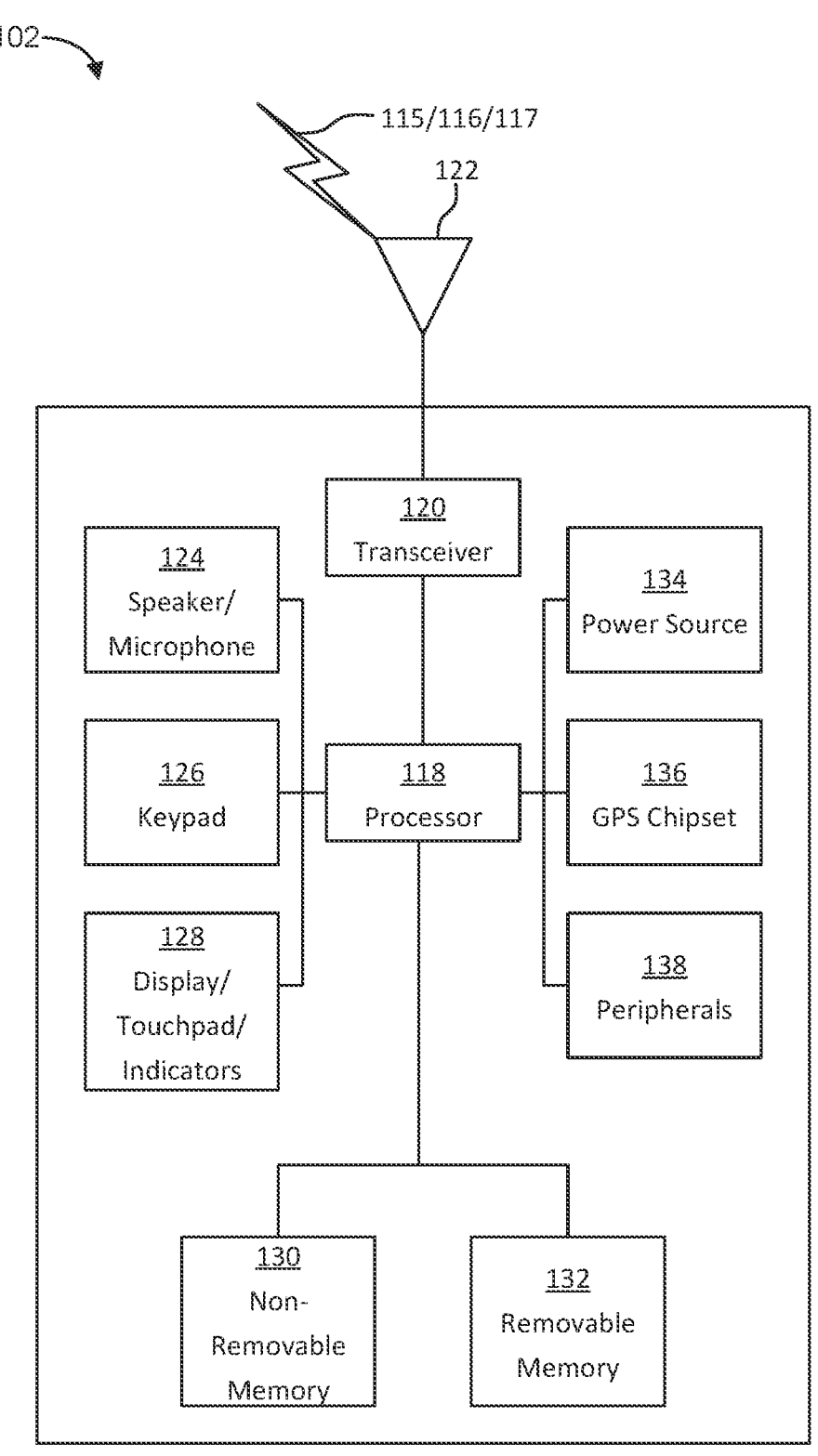
FIG. 1F is a block diagram of an example apparatus or device, such as a WTRU.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
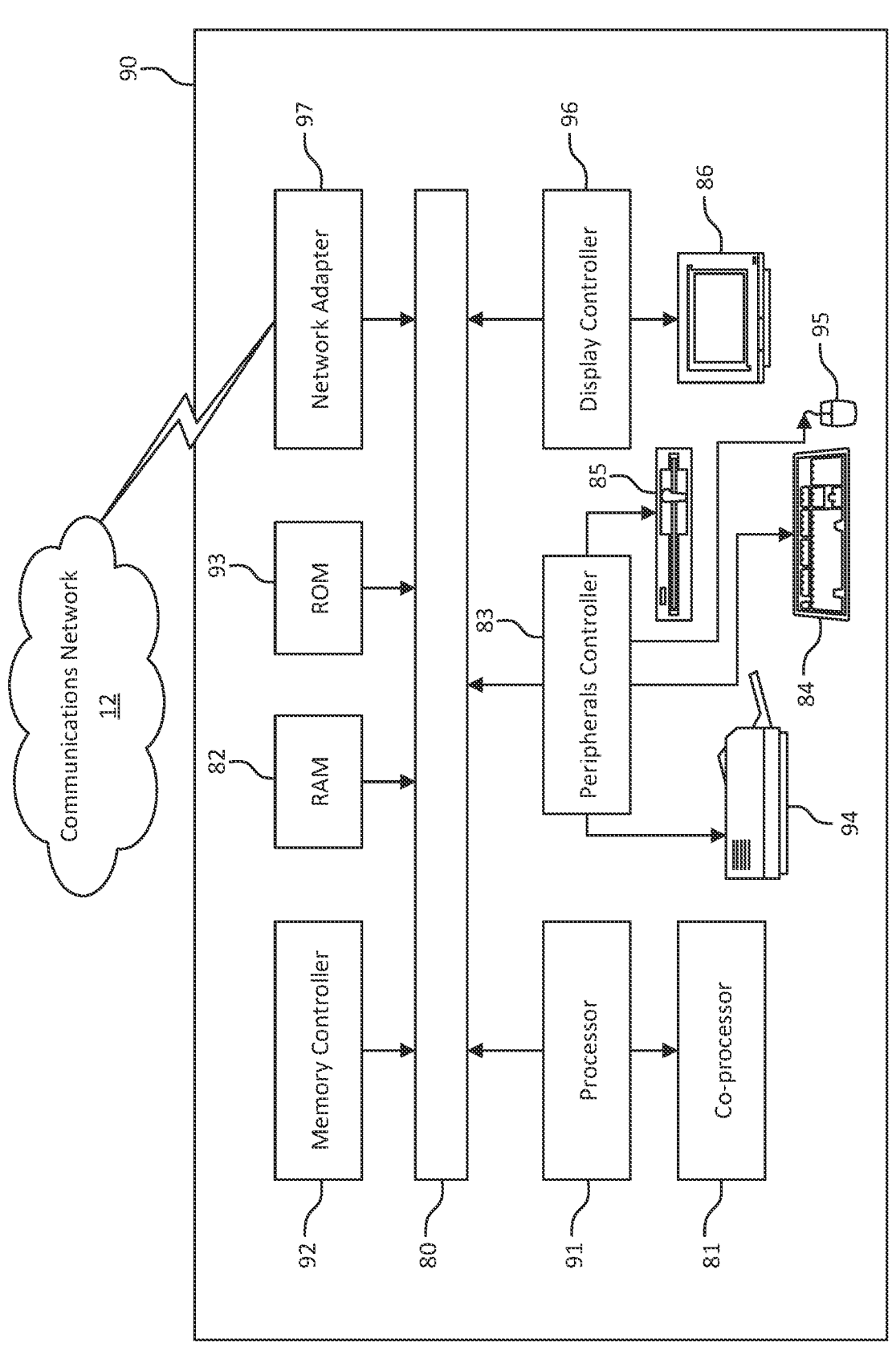
FIG. 1G is a block diagram of an exemplary computing system.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

LTE MBMS Overview and Limitations.

Multicast/Broadcast Multimedia services (MBMS) may be characterized by the distribution of common interest content, from one source entity to a number of receiving entities that are interested in the service. Mobile networks are primarily designed for unicast services, and as a result may not be optimized for multicast/broadcast services. Providing multicast/broadcast services, therefore, may require optimizations in how the traffic from these services is transported over the core network and over the radio access network.

The support of MBMS over LTE networks has evolved considerably over the various releases of LTE. Table 1 shows a summary of the major changes/enhancements by release.

TABLE 1

| Evolution of MBMS in LTE | |
|---|---|
| Release 8 | In this initial release of LTE there is no MBS support. |
| Release 9 | In this release, the main use case was video broadcast. The release introduced changes to RAN and system architecture. MBSFN was included from the start, but on a shared carrier. |
| Release 10-12 | Releases have added counting, service continuity, and MBMS operation on Demand (MooD). |
| Release 13 | Release has added SC-PTM, mostly for public safety use cases. |
| Release 14 | Release has added SC-PTM, for V2X use cases to address latency considerations and for IoT use cases to address reaching a large number of constrained UEs, possibly in power savings mode. Also, added FeMBMS (EN-TV) MBMS dedicated carrier, new frame structure, receive only mode (i.e. no SIM card)). |
| Release 16 | Release has added enhancements to terrestrial broadcast (e.g., new frame structures and new cyclic prefixes) to find solutions that allow EN-TV to meet 5G broadcast requirements for "terrestrial broadcast." |

Figure 2:
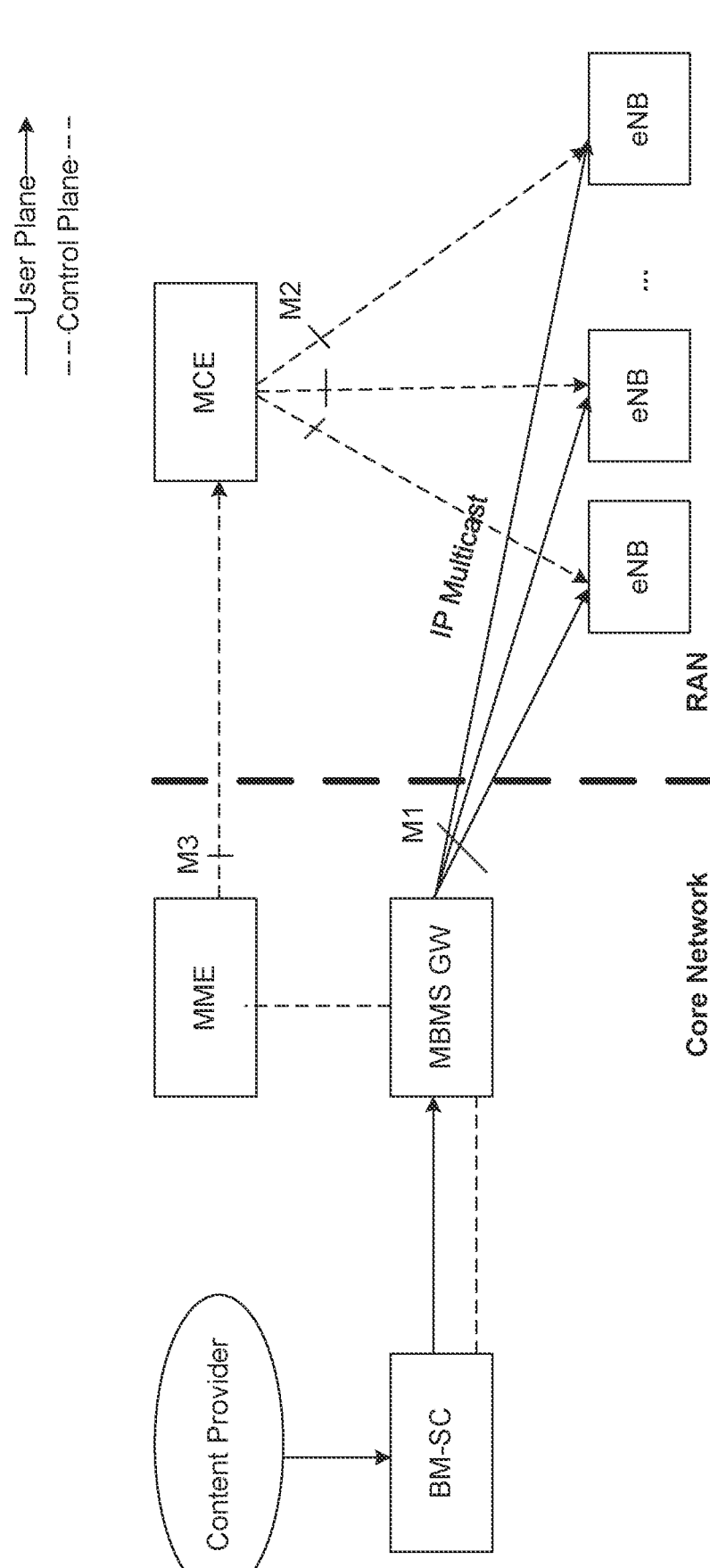
FIG. 2 illustrates an LTE architecture for MBSFN transmission.

LTE networks have supported MBMS since Release 9, through a mechanism referred to as MBSFN (Multicast Broadcast Single Frequency Network). MBMS was provided on carriers that were shared with unicast services. MBSFN required new logical entities in the core network, and it relied on simultaneous transmission of the same MBMS traffic, from one or more eNBs. FIG. 2 shows the LTE architecture for MBSFN transmission. The new logical entities include the BM-SC, the MBMS GW and the MCE. In addition, each of the eNBs shown in FIG. 2 is involved in the MBSFN transmission. The transmissions from these eNBs define an MBSFN Area, an area in where a UE receives MBSFN transmissions from multiple eNBs. The transmissions are over a new Multicast transport channel (MCH) that is mapped to a new physical channel (PMCH—Physical Multicast Channel). The PMCH is only allowed to be transmitted in reserved subframes. That is, subframes that have been set aside by the eNB for the purpose of MBSFN transmission. These subframes are used to carry the MBMS control plane information (Multicast Control Channel MCCH) and the MBS user plane traffic (Multicast Traffic Channel MTCH). From system information, the UEs determine: the subframes set aside for MBS, which of these subframes carry MCCH, and the configuration used for the PMCH. The latter allowing the UE to decode the traffic received on the PMCH in the reserved subframes. The UE then reads the MCCH to obtain scheduling information for the MBMS user plane traffic. That is, which of the reserved subframes contain a flow from a particular multicast/broadcast flow. UEs can then use this scheduling information to determine the multicast/broadcast flows they are interested in, and receive/decode the MBMS traffic. UEs monitor the MCCH to determine if there is any change in the MBMS service offering. Of note, MBSFN operation: can be used for RRC_CONNECTED and RRC_IDLE UEs; only a single transport block may be transmitted in each reserved subframe; only a single transmission is used for MCH (neither blind HARQ repetitions nor RLC quick repeat); and MTCH and MCCH use the RLC-UM mode (whose configuration is fixed and known by the UEs).

Release 10 introduced a RAN-based counting, of UEs in connected mode interested in an MBMS service. This release also allowed the RAN to use any unused MBSFN subframes for unicast transmission. Lastly, this release enhanced the admission control for MBMS sessions by the introduction of the allocation and retention of priority session parameters.

Release 11 introduced service acquisition and service continuity in multi-frequency deployments where the MBMS service is provided via more than one frequency. Initial releases of eMBMS assumed that MBMS features did not affect mobility procedures in E-UTRA. Thus, some UEs that were receiving or interested in MBMS services were unable to receive MBMS services due to cell reselection in RRC_IDLE or handover in RRC_CONNECTED. To address this issue, the network could provide assistance information to inform UEs about mapping information between carrier frequencies and MBMS services, and transmission timing of MBMS services. By using the assistance information, when the UE was interested in a particular MBMS service, the UE in RRC_IDLE could autonomously set the carrier frequency carrying the MBMS service to the highest cell reselection priority for the scheduled time. As a result, it was likely that the UE would reselect to a cell on the carrier frequency carrying the MBMS service. Also in Release 11, for a UE in RRC_CONNECTED, the UE could inform the serving cell about carrier frequencies where MBMS services of interest were scheduled to be transmitted. For this purpose, the RRC layer introduced a new uplink message called the MBMSInterestIndication message. The intention was that the eNB would use this information to select a target cell for handover.

Release 12 introduced as one of the main enhancements: MooD (MBMS operation on Demand), which enables automatic and seamless MBMS service activation and deactivation based on the UEs' service consumption reporting.

Release 13 introduced a major enhancement of Single-Cell Point-to-Multipoint. SC-PTM uses the same new logical entities in the core network (BM-SC, MBMS-GW) but does not rely on simultaneous transmission from multiple eNBs (as in the MBSFN case). Rather, each eNB individually schedules its own MBMS transmissions. These transmissions are transported over the Downlink Shared Channel (DL-SCH) and carried on the Physical Downlink Shared Channel (PDSCH). As a result, unicast traffic and MBMS traffic are multiplexed over the DL-SCH, resulting in more flexible and dynamic radio resource allocation for MBMS transmissions. Also, since the scheduling is not left to the MCE to be synchronized across eNBs, the end-to-end latency is expected to be reduced. For SC-PTM, MBMS is transmitted in the coverage of a single cell. The SC-PTM transmission carries both a control channel (SC-MCCH) and traffic channel (SC-MTCH). SC-MCCH and SC-MTCH transmissions are each indicated by a logical channel specific RNTI on the Physical Downlink Control Channel (PDCCH). Specifically an SC-RNTI for SC-MCCH and G-RNTIs for the SC-MTCHs. Note that there is a one-to-one mapping between each MBMS session supported in a cell, and G-RNTI used for the reception of the DL-SCH to which a SC-MTCH is mapped. Even though SC-PTM is scheduled like the unicast traffic, it does not rely on any UL feedback, and as a result SC-PTM does not support link adaptation or HARQ operation. During the 3GPP work item phase there was some discussion to exploit unicast UL feedback in order to allow advanced link adaptation schemes such as adaptive modulation and coding for groups with a small number of UEs. However, this feature was finally not standardized in release 13. In addition, MBMS transmissions can be configured with a MBMS specific DRX pattern, so that the UE need not continuously monitor for the SC-PTM RNTIs. This pattern follows a simple ON and OFF period, with the DRX Active time being extended when the UE receives SC-PTM traffic. This MBMS specific DRX pattern is independent of the UE specific DRX pattern. Of note, SC-PTM operation: can be used for RRC_CONNECTED and RRC_IDLE UEs; only a single transmission is used for DL-SCH (neither blind HARQ repetitions nor RLC quick repeat); and SC-MTCH and SC-MCCH use the RLC-UM mode (whose configuration is fixed and known by the UEs)

Release 14 introduced MBSFN and SC-PTM for V2X (vehicle to everything) communications, SC-PTM for Internet of Things (IoT), eMTC (enhanced Machine-Type Communication), and NB-IoT (NarrowBand-IoT). Release 14 also introduced many features to enhance the delivery of TV services with eMBMS, to expand the reach of MBMS into traditional TV receivers and to enable the deployment of dedicated broadcast eMBMS networks supporting public broadcasting requirements. Services provided may be distributed in such a way that they can be received by all, including those who are not mobile subscribers. This is also referred to as Receive-only-Mode (ROM) or Free-to-Air.

Release 16 focused on enhancements to terrestrial broadcast (e.g., new frame structures and new cyclic prefixes) to find solutions that allow EN-TV to meet 5G broadcast requirements for "terrestrial broadcast"

Despite the progress made over the many LTE releases, MBMS over LTE still suffers from a number of limitations. A few of these limitations are described below.

Limitation on Air Interface. LTE MBSFN and SC-PTM may be characterized by rigid OFDM (Orthogonal Frequency Division Multiplexing) numerology parameters that limit the type of network deployments. Large area SFN require cyclic prefix lengths that are considerably larger than those allowed for LTE.

Limitation related to coverage area. The coverage area for MBMS deployments is static and not adaptable. This may result in number of limitations. First, for MBSFN transmissions, the MBSFN area is statically configured regardless of user distribution. Second, it is not possible to dynamically create an MBSFN Area on a cell level basis. Third, in a given coverage area, it is not possible to use PTP, single cell PTM, and multi-cell (SFN) PTM to deliver the same service.

Limitation on Local/Regional coverage provision. Local/ Regional services can only be inserted by establishing different MBSFN Service Areas with TDM (Time Division Multiplexing). As a result, these local services will each have its own MBSFN area. In addition, MBSFN is inefficient for cell-area broadcasting since it cannot be configured using MIMO, a short CP and reduced pilot signal overhead.

Limitations on Unicast/Broadcast Multiplexing. For MBSFN, subframes occupy the entire bandwidth. Multiplexing with unicast transmission in the frequency domain is not allowed. TDM is the only multiplexing mechanism allowed in MBSFN.

Limitation on signal diversity techniques. MBSFN and SC-PTM lack frequency interleaving and time interleaving which could significantly improve the reliability of transmission for the receive-only mode that in itself lacks link adaptation techniques due to the uplink channel not being available.

Limitation on Single Frequency Network Operation in SC-PTM. SC-PTM cannot be configured in an SFN operation mode that can be beneficial when multiple cells are transmitting the same content.

Limitation of resource allocation. Up to release 14, only up to 60% of subframes could be allocated to MBSFN services. Release 14 added the option of using 2 additional subframes or the possibility of using all subframes for MBSFN, going up to 80% or 100% of resources allocated to the MBSFN services, respectively. In addition, MBSFN resource allocation is static and it cannot adapt to the network traffic load. Subframes reserved for MBSFN operation are transmitted regardless of the user demand. To overcome this limitation, LTE release 14 allowed mapping of unicast data over the MBSFN subframes in the case that there is no broadcast content available, however, only devices with certain capabilities are able to decode this data.

Limitation of control channel size. For SC-PTM, the mapping of downlink physical channels and signals to physical resources as defined in release 13 has a limitation in that the number of OFDM symbols used for carrying the control channel (as signaled by the Control Format Indicator, CFI) is fixed at 3 for 5 MHz and lower bandwidths, or 2 for 10 MHz and higher bandwidths.

Limitation on link adaptation: The possibility to feedback channel state information to the eNodeB (eNB) about the MBSFN reception for users with uplink capabilities can be useful to perform link adaptation techniques for a group of users. This feature can be especially interesting for deployments with small cells with a limited number of users demanding the same content. In the case of receive only mode receivers with large cells, this feature is less relevant.

Limitation related to feedback channel. There is no feedback from the radio access network to the core MBMS entities about the successful establishment of radio access bearers associated with a certain service. For both MBSFN and SC-PTM, no retransmissions are allowed for the Multicast Traffic Channel (MTCH)/SC-MTCH. There is no dedicated feedback for SC-PTM link adaptation. The RAN implementation could use the feedback mechanisms defined for unicast transmission in proprietary SC-PTM link adaptation solutions, but this is not optimal.

Limitations on Latency. Control plane requires about 5 seconds to setup an MBSFN radio bearer, due to the long Multicast Control Channel (MCCH) modification period. Until release 14, modification periods were 5.12 sec. or 10.24 sec. In release 14 the protocols included fast reconfigurations, still require modification periods of 10 msec. Furthermore, MBSFN area configuration and available MBMS services have to be sent on MCCH periodically requiring an MCCH repetition period, which can be 320 msec. and greater up to 2.56 sec. With the fast reconfiguration in release 14, the repetition period is at least of 10 msec. For SC-PTM, modifications have to be first announced in one modification period and actually signaled in the next modification period. Modification period can be one radio frame in release 14, and up to 2, 4, 8, . . . , 256, . . . 65536 radio frames in release 13. In addition, the offered MBMS services have to be sent on SC-MCCH periodically, where the repetition period is 1 radio frame in release 14, and 2, 4, 8, . . . , 256 radio frames in release 13. For MBSFN, the user plane requires a minimum delay of 40 msec. (long multicast transport channel scheduling period) for mixed unicast/broadcast transmission. For SC-PTM, scheduling information for each service, i.e., each SC-MTCH, is provided in the system information. The UE attempts to receive SC-MTCH continuously or according to the discontinuous reception configuration.

Limitations regarding Service continuity: Service continuity is limited in MBSFN to the MBSFN service area. To keep the service continuity in SC-PTM the UE is allowed to switch to unicast in a case of a handover and the new serving cell not transmitting a SC-PTM transmission. This feature is relevant for Mission Critical Services, where the degree of reliability of the service must be maintained.

Limitations related to UE interest indication. In order to know, from the network side, the UE interest in a specific service, UEs have to indicate such interest via an "MBMS interest indication" Radio Resource Control (RRC) message in several cases including upon successful connection establishment, upon entering or leaving the service area, upon session start or stop, upon change of interest, upon change of priority between MBMS reception and unicast reception or upon a change to a PCell broadcasting. For MBSFN, the MCE (Multi-cell/multicast Coordination Entity) can use the MBMS counting procedure to count the number of RRC_CONNECTED mode UEs which are receiving via an MRB or interested to receive via an MRB the specified MBMS services.

Limitations regarding Inflexible control information acquisition. In order to save UE battery power in monitoring for the available of an MBMS broadcast, a trigger must come from the network side to wake up the MBMS reception. The control plane and the indication of control information change is shared by all MBMS services within an MBSFN area or cell. This may have negative impacts on many aspects of the system and the UE performance when multiple services with various latency requirements use MBMS in the same MBSFN area or the same cell. For example, a UE interested in an MBMS service allowing for longer latencies must monitor for the control information change more frequently than necessary resulting in battery drain. It may not be necessary to specify a specific/explicit trigger mechanism for broadcast control information acquisition in 5G but if may be sufficient to include an MBMS notification in the paging message.

Limitations on Power Savings. SC-PTM transmissions may be configured with an MBMS specific DRX pattern. This pattern is independent of the UE specific DRX pattern configured in the UE. As a result, the UE is monitoring the PDCCH when it is in Active time for either of these two configured DRX patterns. Because of the lack of coordination, this may lead to certain power consumption issues.

NR MBS Requirements, Use Cases, and Work Item Objectives.

3GPP RAN has considered a number of use cases which would benefit from 5G MBS support. The use cases may be classified into 4 main categories:

Media & Entertainment. For example, a number of users
        may be interested in receiving shared Virtual Reality or
        Augmented Reality content.
    Public Warning. Users may be notified with alerts, carrying multimedia messages including: the description
        of the type of the alerts and multimedia data that give
        instructions, advice, and additional information to users
        (e.g., picture of a missing child, map of last known location, or instructions on what to do). This traffic is "ad-hoc" in nature as the user has not necessarily subscribed to this service.

Automotive. Various V2X applications require information delivered from the Intelligent Transport System (ITS) infrastructure (such as ITS roadside units and sensors) to the vehicle. For example, road safety, signage, mapping, or autonomous driving.

IoT. In many situations we may have to send a firmware update to a large number of devices, or a new configuration to a large number of devices. The devices themselves may have reduced capability.

The requirements for these use cases in terms of bit rate, latency, user density, and reliability may vary, but each would benefit from a form of PTM transmission in the RAN. Based on these use cases, 3GPP has determined a number of requirements related to 5G MBS (See, TS 22.261, Service requirements for the 5G system, V16.11.0, and TR 38.913, Study on scenarios and requirements for next generation access technologies, V15.0.0.). During the scoping for release 17, 3GPP RAN converged on a series of high-level requirements that are expected from 5G MBS, as follows.

Bit rate, can be very high.

Latency, can be very low.

Reliability, must support use cases with extremely high reliability.

Density, should be able to deal with extremely dense deployments.

Mobility, should be able to handle high mobility UEs.

Flexibility, wherein operator should be able: to dynamically change the capacity reserved for MBS (from 0% to 100%), to dynamically change the size of service area (service area can have granularity as small as a cell to as large as a country), and to provide MBS coverage over small areas and over large areas (e.g. country wide).

Efficiency, wherein the operator should be able to dynamically change how the service is provided to the UE (multicast, broadcast, unicast, PTP, PTM) and the UE should be able to receive multiple parallel services (one or more unicast services plus one or more MBS services).

As a result, a 3GPP RAN group has started a new work item that addresses some of the limitations of the MBMS operation over LTE and tries to meet the requirements listed above. (See, RP-201038, Work Item on NR Multicast and Broadcast Services). The new work item has two main objectives.

The first objective of the new work item is to specify RAN basic functions for broadcast/multicast for UEs in RRC-_CONNECTED state, including:

specifying a group scheduling mechanism to allow UEs to receive Broadcast/Multicast service (also including specifying the necessary enhancements that are required to enable simultaneous operation with unicast reception);

specifying support for dynamic change of Broadcast/ Multicast service delivery between multicast (PTM) and unicast (PTP) with service continuity for a given UE;

specifying support for basic mobility with service continuity;

specifying required changes to improve reliability of Broadcast/Multicast service, e.g., by UL feedback, where the level of reliability should be based on the requirements of the application/service provided; and studying the support for dynamic control of the Broadcast/Multicast transmission area within one gNB-DU and specifying what is needed to enable it, if anything.

The second objective of the new work item is to specify RAN basic functions for broadcast/multicast for UEs in RRC_IDLE/RRC_INACTIVE states [RAN2, RAN1]. Specifying the required changes to enable the reception of Point to Multipoint transmissions by UEs in RRC_IDLE/ RRC_INACTIVE states, with the aim of keeping maximum commonality between RRC_CONNECTED state and RRC_IDLE/RRC_INACTIVE state for the configuration of PTM reception.

Note that the new work item does not include any objectives related to FR2 operation, SFN operation, dynamic resource allocation of up to 100% to MBS, and Receive only-mode operation. Despite this, there is a general requirement that any design decisions taken should not prevent introducing such features or operations in future releases.

Problem Statement.

The first two releases of 5G RAN do not support MBS. Release 15 and release 16 design decisions were made to support only unicast services over the Uu interface. Based on release 16, 5G design, the 5G MBS requirements, and the LTE MBMS limitations, the following problems need to be resolved in order to allow 5G RAN to support MBS.

The first problem is of architecture to support 5G MBS. The current 5G architecture does not support efficient MBS transmission. Based on the UTRAN and E-UTRAN MBMS architectures, a number of functionalities need to be added to the 5G architecture to allow MBS operation. The architecture needs to support dynamic control of the MBS transmission area, allowing cells to be added or removed from this area. The architecture needs to support multiplexing of unicast QoS flows and MBS QoS flows to a specific UE. The architecture also needs to permit the gNB to dynamically change the resource allocation reserved for PTM traffic as well as to dynamically switch the RAN delivery method of an MBS QoS flow. The architecture needs to manage the synchronization issue for the SFN deployment, especially if the MBS transmission area is over multiple gNBs (for example a nationwide MBS). Furthermore, the architecture needs to support the different 5G MBS bearer types.

The second problem is of scheduling methods and procedures. As described above, there are many limitations to the MBMS scheduling in prior generation of MBMS in cellular systems such as LTE/EPS or GPRS. For example, an MBMS coverage area such as MBSFN area is statically configured regardless of user distribution. It is not possible to dynamically create an MBSFN area on a cell level basis, nor it is possible to use different bearer types such as PTP bearer, Single cell PTM bearer or multi-cell PTM bearer to deliver the same service within a given MBMS coverage area such as an MBSFN area. Furthermore, the Multicast transport Channels (MCHs) of the same MBSFN area, which are multiplexed in the same Common Subframe Allocation period must be transmitted in consecutive order within the CSA period, i.e., all subframes used by MCH n in a CSA are transmitted before the subframes used for MCH n+1 in the same CSA period. This is very restrictive especially for the multiplexing of latency sensitive services, and may also force an unnecessary creation of several overlapping MBSFN areas such that only MCHs carrying MBMS services with similar latency requirements are mapped to the same MBSFN area and therefore to the same CSA, leading to potential implementation complexities.

Another consequence of static configuration of MBMS coverage area such as MBSFN area, for transmission of the same data at the same time throughout the MBMS coverage area is the static resource configuration, which means adaption to traffic load is slow. For example, subframes reserved for MBSFN operation are transmitted regardless of the user's demand, which may translate to waste of radio resources, unless unicast data is available for transmission over the unused MBSFN subframe, and this can only benefit UE with the right capabilities. Furthermore, static resource allocation and slow adaptation to traffic load or change in traffic profiles also means long latency which might not be suitable for some of the NR use cases. Furthermore, control plane requires about 5 sec. to setup an MBSFN radio bearer, due to the long Multicast Control Channel (MCCH) modification period. Until release 14, modification periods were 5.12 sec. or 10.24 sec. In release 14 the protocols included fast reconfigurations but still require modification periods of 10 msec.

MBSFN area configuration and available MBMS services have to be sent on MCCH periodically requiring an MCCH repetition period, which can be 320 msec. and greater up to 2.56 sec. With the fast reconfiguration in release 14, the repetition period is at least of 10 msec. Additionally, the multiplexing of unicast and broadcast is restricted to the time domain multiplexing. For example, for MBSFN, subframes occupy the entire bandwidth. Multiplexing with unicast transmission in the frequency domain is not allowed. Also the user plane requires a minimum delay of 40 msec. (long multicast transport channel scheduling period,) for mixed unicast/broadcast transmission.

Inflexible control information acquisition. In order to save UE battery power in monitoring for the availability of an MBMS broadcast, a trigger must come from the network side to wake up the MBMS reception. The control plane and the indication of control information change is shared by all MBMS services within an MBSFN area or cell. This may have negative impacts on many aspects of the system and the UE performance when multiple services with various latency requirements use MBMS in the same MBSFN area or the same cell. For example, a UE interested in an MBMS service allowing for longer latencies must monitor for the control information change more frequently than necessary resulting in battery drain. It may not be necessary to specify a specific/explicit trigger mechanism for broadcast control information acquisition in 5G but it may be sufficient to include an MBMS notification in the paging message.

Because of these limitations, the current NR design and the NR requirements for multicast and broadcast services, there is a need for a multi-cell PTM (MC-PTM) multicast and broadcast design that improves on LTE limitations in terms of scheduling latency and spectral efficiency, and allows a more flexible scheduling in both time domain as well as frequency domain. Using LTE as baseline, the design enhancements should include for example enhancements to multicast/broadcast area configuration, enhancements to MCH resource allocation in time domain and frequency domain including update notification to the UE, enhancement to MTCH resource scheduling in time domain and frequency domain including update notification to the UE, and enhancements to MCCH resource scheduling in time and frequency domain including update notification to the UE. Additionally, the design of the scheduling needs to consider UE power saving and battery life requirements, as well as the beam centric nature of NR systems. For example, the UE in each multicast or broadcast area should be able to receive MBS data and also be able to sleep as much as possible to save power. This means UE being schedule for MBS data reception at the same time should be able to receive data with ideally no impact to DRX opportunities. Similarly, in each multicast area or broadcast area, UEs served by beams of different SSBs or beams of different CSI-RS needs to receive multicast or broadcast data at different time according to the beam sweeping timing. This need to be reflected in the scheduling design and may also possibly impact coordination between RAN and the core network entities such as the MBS gateway or BM-SC.

Same issues as captured above for the MC-PTM multicast or broadcast design for the most part also need to be addressed for the SC-PTM. For example, for SC-PTM, scheduling information for each service (i.e., each SC-MTCH) is provided in the system information. The UE attempts to receive SC-MTCH continuously or according to the discontinuous reception configuration. The SC-MTCH MBS scheduling in time domain in terms of MCH, MTCH, and MCCH resource allocation configuration and mapping may be enhanced in a way that is friendly to UE power consumption and battery life. Regarding the use of SC-MCCH scheduling by means of repetition period and modification period mechanism, for example, using system information broadcast, the modifications have to be first announced in one modification period and actually signaled in the next modification period. Modification period can be one radio frame in release 14, and up to 2, 4, 8, . . . , 256, . . . 65536 radio frames in release 13. In addition, the offered MBMS services must be sent on SC-MCCH periodically, where the repetition period is 1 radio frame in release 14, and 2, 4, 8, . . . , 256 radio frames in release 13. The capability of the existing LTE design with respect to latency may need to be updated to meet NR MBS latency requirements.

The third problem is of bearer management procedures. Considering the limitations of the existing MBMS design as highlighted herein, NR MBS design will be different in many ways. New bearer management procedures, including enhancements to the legacy MBMS bearer management procedures, will be needed. NR MBS bearer management procedures—such as MBS bearer establishment procedure, MBS bearer modification procedure, and MBS bearer release procedures—need to be specified. The use of UE interest indication—for counting procedure, procedure for legacy MBMS like consumption report and MBMS Operation On Demand (MooD) in support of MBS bearer management—need to be specified. For example, in the legacy system, in order to know, from the network side, the UE interest in a specific service, UEs have to indicate such interest via an "MBMS interest indication" Radio Resource Control (RRC) message in several cases, including: upon successful connection establishment; upon entering or leaving the service area; upon session start or stop; upon change of interest; upon change of priority between MBMS reception and unicast reception; or upon a change to a PCell broadcasting. For legacy MBSFN, the MCE (Multi-cell/multicast Coordination Entity) can use the MBMS counting procedure to count the number of RRC_CONNECTED mode UEs which are receiving via an MRB or interested to receive via an MRB the specified MBMS services. Similar mechanisms or enhancement to such mechanisms need to be specified for NR taking into account NR MBS requirements.

The fourth problem is of BWP Considerations. In NR, MBS is expected to be delivered to the UE through a mix of bearers, wherein different type of MBS bearers—such as PTP bearers, SC-PTM bearers, or MC-PTM bearers—are multiplexed for delivery of PTP services and PTM services to UE. In release 15 and release 16 NR, the UE may be configured with more than one BWP but can only use one BWP at a time. It is reasonable to expect similar design constraints for release 17, at least based upon UE capabilities. Additionally, it is possible that some release 17 UEs may be able to use more than one BWP at a time, i.e., the UE may be able to use two or more BWPs in downlink and two or more BWPs in uplink. In this context, enhanced rules for BWP configurations and BWP operations—such as BWP switching and coordination of such BWP switching operation between the UE and the network—need to be specified. Architecture.

RAN Xcast Areas. Key MBS architecture concept, disclosed herein, may comprise the concept of xcast area. A new MBS xcasting area, denoted herein as RXA, may be introduced at the RAN level. Xcast may be for multicast or broadcast. For example, gNB-CU level, a CU-RXA may be defined. Similarly, DU-RXA may be defined for RXA area at the DU level. A single cell casting area may also be defined as an SC-RXA xcasting area. Within a DU, the DU-RXA may be identified solely by the DU-RXA Identity. Similarly, within a CU, the CU-RXA may be identified solely by the CU-RXA identity. It should be noted that when there is no gNB split into CU and DUs, gNB-CU Xcast area and gNB-DU Xcast area may simply be referred to as gNB Xcast area. A single cell xcasting area may be identified by the SC-RXA identity which might be, for example, the cell identity or any other identity configured into the UE, by the network, for this purpose. A gNB-CU level Xcast area may be comprised of a collection of gNB-DU level Xcast areas. Similarly, a gNB-DU level Xcast area may be comprised of a collection of SC-RXA areas. Alternatively, a RAN Xcast area may be defined above the level of a CU, for example, encompassing multiple gNB CUs (or gNBs). As another alternative, a RAN Xcast area may be defined as any general grouping of cells which may belong to different gNB-DUs, gNB-CUs, or gNBs. In such a case, the RXA may be comprised of a collection of SC-RXA areas. A RAN xcast area may be defined for a single MBS service or a group of MBS services. The grouping of MBS services belonging to the same RXA may be determined by the RAN node based on, e.g., MBS traffic patterns or similar scheduling needs. Alternatively, this may be provided by the core network based on, for example, the needs of the content provider.

Figure 3:
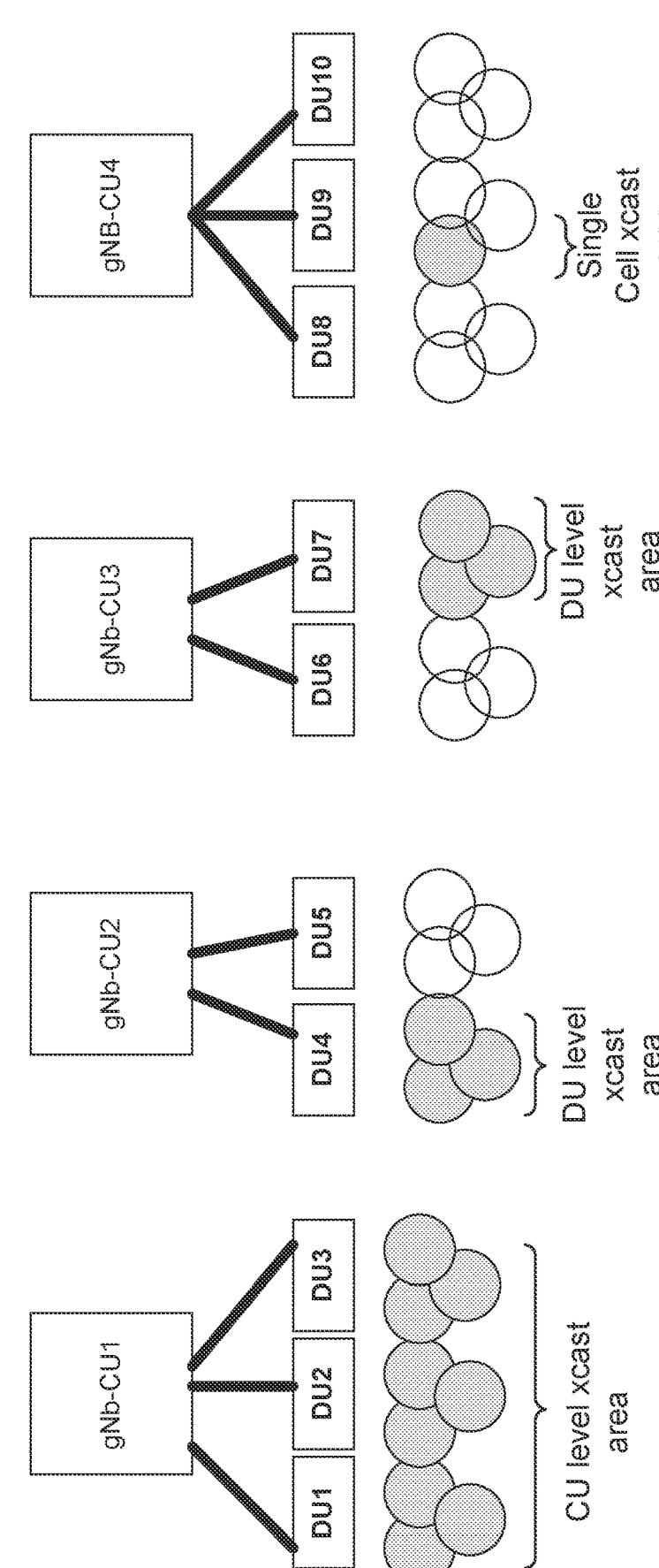
FIG. 3 illustrates RAN Xcast areas.

FIG. 3 shows an example of an RXA, comprising a CU level xcast area, two DU level xcast areas, and Single Cell (SC) xcast area. It should be understood that the RXA illustrated in FIG. 3 is an example and any grouping of CU level, DU level, or SC level xcast areas may be used. For example, a RAN Xcast area may be made up of a single CU level xcast area. Also note that the RAN xcast area need not necessarily be contiguous.

A RAN Xcast area may be considered a grouping of one or more cells that provide an MBS service, or group of MBS services, through one or more RAN delivery methods that may be known to the UE or may be determined by the UE. In other words, a UE receiving an MBS service (or group of MBS services) in one cell of an RXA, will also know how to receive the same MBS service (or group of MBS services) in another cell of the RXA.

A RAN Xcast area may be identified by an Xcast area identity (RXA ID). Depending on the level of the RXA, this identity may be a gNB ID, a gNB-CU ID, a gNB-DU ID, a cell ID, some other existing identifier (for example, a RAN Notification Area ID, or Tracking Area ID), or some other new identifier defined for this purpose. Alternatively, an RXA may be identified by a set of lower level identifiers. For example, a CU-RXA may be identified by a set of DU-RXA identities or a set of SC-RXA identities.

At mobility, the UE may consider that the DU-RXA area is continuous when the source cell and the target cell broadcast the same value in the DU-RXA identity. Similarly, at mobility, the UE may consider that the CU-RXA area is continuous when the source cell and the target cell broadcast the same value in the CU-RXA identity.

The different Xcast area defined above, referred to herein as Xcast area type. For example, an Xcast area type may be gNB-CU level Xcast area, gNB-DU level Xcast area, or a single cell level Xcast area. More specifically the RAN Xcast area type may be a multi-cell RAN Xcast area (MC-RXA) or a single cell RAN Xcast area (SC-RXA).

Hereinafter, the terms Xcast, xcast, Xcasting or xcasting will be used interchangeably. Similarly, the terms xcast area will be used to generically denote any of the xcast area type defined herein unless otherwise stated.

RAN Delivery Method & MBS Bearer Types. 5G MBS may be offered through one or more of the following RAN delivery methods. RAN delivery methods may be of unicast radio bearer type or MBS radio bearer (MRB) type.

Single Cell point-to-point (SC-PTP). The MBMS service may be provided through a PTP bearer over the RAN. There may be a single SC-PTP bearer between a RAN node and each of the UEs receiving the MBS service. The delivery method may be used while the UE is in RRC_CONNECTED state.

Single Cell point-to-multipoint (SC-PTM). The MBMS service may be provided through a PTM bearer over the RAN. There may be a single shared SC-PTM bearer between a RAN node and each of the UEs receiving the MBS service in the cell. The delivery method may be used while the UE is in RRC_CONNECTED state, RRC_INACTIVE state, or RRC_IDLE state.

Multi Cell point-to-multipoint (MC-PTM). The MBMS service may be provided through a PTM bearer over the RAN. The UEs receiving the MBS service may receive the MBS traffic from one or more RAN nodes. The RAN nodes may send the same MBS traffic, and the transmissions from these nodes may be synchronized. The delivery method may be used while the UE is in RRC_CONNECTED state, RRC_INACTIVE state, or RRC_IDLE state. There may be a single shared MC-PTM bearer between each of the RAN nodes transmitting the MBS service and each of the UEs receiving the MBS service.

Xcast bearer models—including MC-PTM xcast in non-SFN scheme, MC-PTM xcast in SFN scheme, SC-PTM xcast scheme, and Unicast PTP bearer—defined herein as follows.

In the MC-PTM xcast in non-SFN scheme, the same MBS content data packet may be xcasted from one or more cells within an xcast area, wherein the transmission of the same data packet may be time synchronized across the transmitting cells, but transmission from different cells may be on different radio resources including different carrier frequencies, and different transmission control parameters (e.g. MCS, TBS).

Corresponding to the non-SFN MC-PTM transmission scheme, is a non-SFN MC-PTM bearer type. This bearer type may be modelled as split bearer with the split at the SDAP, at the PDCP, or at the RLC layers. The bearer may be multi-cell bearer (i.e., inter-cell legs bearer or multi-cell leg bearer) by design as the number of legs in this bearer type is proportional to the number of cells within the xcast area providing coverage to the UE. There may be a procedure to limit how many legs the bearer may have. This may be tied to the UE capability or to the radio conditions between the UE and the cell. In one alternative, the DL-SCH may be used as a transport channel for this bearer type, and the PDSCH as the physical downlink shared channel. The corresponding traffic logical channel and signaling control logical channel may be generically denoted MCMF-MTCH (multi-cell multi-frequency MTCH) and MCMF-MCCH (multi-cell multi-frequency MCCH), respectively. In another alternative, the MCH may be used as a transport channel, that might be mapped to a PMCH physical channel.

In an MC-PTM xcast in SFN scheme, the same MBS content data packet may be xcasted from one or more cells within an xcast area, wherein the transmission of the same data packet may be time synchronized across the transmitting cells, and transmission from different cells may use the same radio resources including the same carrier frequency and the same transmission control parameters (e.g., MCS or TBS).

Corresponding to the SFN MC-PTM transmission scheme, is the SFN MC-PTM bearer. In this scheme, the bearer may be one leg only based bearer (no inter-cell leg) in the sense that multi-cell transmission may be transparent to the UE and the bearer is single-cell bearer by nature. There may be more than one intra-cell leg for this type of bearer, where the legs may be used for reliability or to assist in mobility. The MCH may be used as a transport channel for this bearer type, and the PMCH as the physical channel. The corresponding traffic logical channel and signaling control logical channel may be MCSF-MTCH (Multi-cell single-frequency MTCH) and MCSF-MCCH (Multi-cell single-frequency MCCH), respectively.

The SC-PTM xcast scheme may be a special case of either non-SFN MC-PTM or SFN MC-PTM xcast scheme, wherein the MBS content data packet may be xcasted from one cell. The corresponding SC-PTM bearer may be a single-cell bearer. According to some aspects, there may be more than one intra-cell leg for this type of bearer, where the legs are used for reliability or to assist in mobility. For the case that there is more than one intra-cell leg, the bearer type may be modelled as split bearer with the split at the SDAP, at the PDCP, or at the RLC layers. The DL-SCH may be used as a transport channel for this bearer type and the PDSCH as the physical downlink share channel. The corresponding traffic logical channel and signaling control may be SC-MTCH (Single cell MTCH) and SC-MCCH (Single cell MCCH), respectively.

A Unicast PTP bearer may be a single cell bearer based by nature. In the Unicast PTP bearer, the control information may be provided to the UE over the DCCH while the traffic may be carried over the DTCH logical channel.

The MBS radio bearer (MRB) types may be either of the first three types of bearers defined above (namely non-SFN MC-PTM, SFN MC-PTM, SC-PTM). Furthermore hereinafter, the term TrCh (transport Channel) will be used in reference to either MCH or DL-SCH, unless otherwise explicitly stated. Hereinafter, the terms SC-PTP bearer and unicast PTP bearer are used interchangeably. Hereinafter, the term MC-PTM bearer will be used to refer to both non-SFN MC-PTM and SFN MC-PTM.

MBS Cells/BWP Operations. MBS operation may be over an MBS Dedicated cell (that is cells that are dedicated for MBS transmission) or over MBS/Unicast-mixed cell (that is cells performing both MBS and unicast transmissions). For MBS/Unicast mixed cells: MC-MTCH and MC-MCCH may be mapped on MCH or DL-SCH for MC-PTM transmission; SC-MTCH and SC-MCCH may be mapped on DL-SCH for SC-PTM transmission; and transmission of both unicast and MBMS in the cell may be done in a co-ordinated manner. In the mixed cell case, the transmission of MBS traffic may be in a dedicated bandwidth part (BWP), reserved for MBS. The unicast and MBS transmissions may then be in different BWPs. For example, this BWP may have a longer cyclic prefix making it more suitable for MC-PTM operation.

In one example use case, a UE may be in RRC_CONNECTED mode receiving unicast traffic on BWP1, and at the same time be interested in receiving a broadcast service offered over BWP2, with BWP2 not overlapping with BWP1 or with BWP2 and BWP1 only partially overlapping. In such a case, some UEs may be capable of receiving transmissions over both BWPs simultaneously. Other UEs may not be able to receive transmissions over both BWPs simultaneously.

For those UEs that are not be able to receive transmissions over both BWPs simultaneously, the UE may rely on a (pre)configured priority to determine which transmission to prioritize. For example UE may always prioritize broadcast transmissions over BWP2, UE may always prioritize unicast transmissions over BWP1, UE may prioritize one over the other based on a comparison of the priority of the unicast transmissions and the broadcast transmissions, and/or UE may prioritize one over the other based on a comparison of the priority of the traffic relative to a threshold. For example, assume the value of the priority is inversely related to the priority of the traffic. If the unicast traffic priority is below a unicast threshold, the UE may prioritize the reception of unicast traffic. If the broadcast traffic priority is below the broadcast threshold, the UE may prioritize reception of the broadcast traffic.

According to some aspects, for those UEs that are not able to receive transmissions over both BWPs simultaneously, the UE may send an indication to the network to notify it about its interest in the broadcast service. This message may include the BWP of the broadcast service. The indication may be sent when the UE is configured with a BWP for the unicast transmissions that is different from the BWP of the broadcast transmissions and the UE is not capable of simultaneous reception over both BWPs. Alternatively, the indication may be sent when the UE decides to start reception of a broadcast service which is received over a BWP that is different than the BWP used for the unicast transmissions. Alternatively, the indication may be sent when a broadcast service starts, and the service is transmitted over a BWP that is different than the BWP used for the unicast transmissions. The indication may be sent using an MBS Interest Indication or another new RRC message.

According to some aspects, for those UEs that are not able to receive transmissions over both BWPs simultaneously and the broadcast service is offered over multiple BWPs, the UE may select a different BWP which has more overlap with the unicast BWP.

The network may use this indication to avoid scheduling unicast transmission when the UE is receiving the broadcast transmissions; alternatively the network may provide the broadcast service for this UE over a unicast PTP bearer over the unicast BWP1. According to some aspects, the network may provide the unicast service for this UE over the broadcast BWP2.

Bearer Management and Scheduling Procedures.

In an aspect, an xcast area may support one MBS bearer type, wherein the MBS bearer may be of type non-SFN MC-PTM bearer type, SFN MC-PTM bearer type, or SC-PTM bearer type. For example, an MC-RXA may be associated with either a non-SFN MC-PTM bearer type, or an SFN MC-PTM bearer type. For the non-SFN MC-PTM bearer type case, the UE may be configured with the cell specific configuration (e.g., transmission control parameters such as MCS or TBS) associated with the bearer. Similarly, an SC-RXA may be associated with an SC-PTM bearer type. More than one type of bearer may be configured into the UE for the same MBS service (or group of MBS services). Similarly, more than one xcast area type may be configured into the UE for the same MBS service (or group of MBS services). A switch of bearer type associated with a service (or group of services) may be performed in the UE and the network. The trigger for the bearer switch may be network initiated, UE initiated, or network initiated with assistance information from the UE, such as MBS service counting.

In another aspect, an xcast area may be associated with one or more bearer types, wherein more than one type of bearer may be configured into the UE for the same MBS service (or group of MBS services). In one alternative, the configured bearers may be tied to the specific cells or grouping of cells making up the xcast area. In a first example, an xcast area may be made up of one or more CU level xcast areas, one or more DU level xcast areas, and one or more SC level xcast areas. In such a case, the UE may be configured with the bearer for each CU level xcast area, the bearer for the each DU level xcast area, and the bearer for each SC level xcast area. In another alternative, each cell or grouping of cells may have multiple configured bearers, of which only one is active at a time. In the same first example, the UE may have multiple bearer configurations for the DU level xcast area. In other words, the UE may be configured with a non-SFN MC-PTM bearer as well as an SFN MC-PTM bearer for this DU level xcast area. A switch of bearer type associated with a service (or group of services) may be performed in the UE and the network. The trigger for the bearer switch may be network initiated, UE initiated, or network initiated with assistance information from the UE such as MBS service counting.

In another aspects, an xcast area may be associated with one or more bearer types for the same MBS service (or group of MBS services), wherein first type of bearer may be configured into a first UE and a second type of bearer may be configured into a second UE. A switch of bearer type associated with a service (or group of services) may be performed in each UE and the network. The trigger for the bearer switch may be network initiated, UE initiated, or network initiated with assistance information from the UE, such as MBS service counting.

According to some aspects, MCCH may be generically used in reference to MCMF-MCCH, MCSF-MCCH or SC-MCCH, unless otherwise explicitly stated. Similarly, MTCH may be generically used in reference to MCMF-MTCH, MCSF-MTCH or SC-MTCH, unless otherwise explicitly stated.

In an aspect, the information carried in the MCCH channel may be referred to as MBS control information. The MBS control information may include information relating to the radio bearer configuration of the MBS service, as well as the MAC and PHY configuration associated with the MBS service. In an aspect, how the MBS control information is received through the MCCH logical channel may depend on whether the service is a broadcast service or a multicast service.

For broadcast services, the MBS control information may be received through the MCCH logical channel carried over common signalling.

For multicast services, the MBS control information may be received through the MCCH logical channel carried over dedicated signalling, common signalling, or a combination of dedicated and common signalling. The following bearer types may be supported for multicast services: non-SFN MC-PTM bearer, SFN MC-PTM bearer, SC-PTM bearer, SC-PTP bearer, or SC-PTM split bearer. For RRC_CONNECTED mode UEs, the MBS control information for each of the above bearers may be provided through dedicated signaling. For non-SFN MC-PTM bearers, SFN MC-PTM bearers, and SC-PTM bearers, the UE may provide the MBS control information through common signaling. For the SC-PTM split bearer, a combination of dedicated signaling and common signaling may be used. The UE may provide the MBS control information of the PTM leg over common signaling and the MBS control information of the PTP leg through dedicated signaling. The MBS control information of the PTM leg may contain a list of PTM leg configurations (e.g., numbered 1 through K). This information may be common to a number of UEs. The MBS control information of the PTP leg may contain an index pointing to the PTM leg configuration in the list of PTM leg configurations In an aspect, a UE may be configured with one MCCH logical channel per Xcast area. In another aspect, a UE may be configured with more than one MCCH logical channels in an xcast area. Similarly, a UE may be configured with one MCCH logical channel type per Xcast area. In yet another aspect, a UE may be configured with more than one MCCH logical channel type in an Xcast area. Different MCCH channels or logical channel type may be used to configure, schedule, or control different bearer types operation for the same service. In an embodiment, one MCCH logical channel may be used to configure, schedule or control all MBS services provided in an Xcast area. In yet another embodiment, one MCCH logical channel may be used to only configure, schedule or control a group of MBS services that is a subset of all MBS services provided in an Xcast area. A UE may be configured with group based MCCH scheduling configuration parameters, for example, group based MCCH modification cycle and group based MCCH repetition cycle, wherein an MCCH used to configure, schedule or control a group of services or service type is configured into the UE with group based MCCH modification cycle and group based MCCH repetition cycle. The UE may receive in an Xcast area, one or more groups of services denoted herein as service types, wherein each group of services or service type may be a subset of all services provided in that Xcast area, and wherein each group of services or service type is configured, scheduled or controlled by a different MCCH. Similarly, different MCCH channels or logical channel types may be used to configure, schedule or control different bearer types operation for the same MBS service, or for different MBS Services.

A new SIB may be introduced in NR to carry MCCH configuration information and the information needed by the UE to acquire the MCCH. Validity area may be associated with the new SIB, so the UE does not have to reacquire it every time it may change a cell. A new SIB may be specified for each MCCH type introduced herein.

As part of the scheduling, the UE may be configured with configuration information for one or more BWP. For LTE, the operation bandwidth may be derived from MIB or MBMS-MIB. For NR, the BWP may be signaled with information for the transmission of the PDSCH or PMCH. A question may be, whether the signaled BWP is the same as BWP of coreset 0 or different one. It may be possible to signal different BWP as part of MCCH content for reception of MCHs. Different BWP may be possible also for MCCH scheduling information, carrying for example the SIB that carries MCCH scheduling info. Similarly, a BWP to be used for the transport of MTCH traffic may be different from that of MCCH traffic.

MCCH Change Notification. For MCCH change notification, the change may be indicated at the granularity of MBS service or group of service level within an Xcast area, and not just at the level of an Xcast area, i.e. the UE supports and can be configured to receive change notification through an MCCH change notification which may apply to all MBS services provided within an Xcast area, or which may apply to a subset of or a subgroup of MBS services within the MBS services configured for an Xcast area. Such subset or subgroup of services may comprise only one service or a group of two or more MBS services. MBS service type or subgroup of MBS services or group of MBS services are used interchangeably herein to denote the grouping of MBS services for the purpose of configuring or scheduling or controlling such group of MBS services, with service group based MCCH. One or more service group based MCCHs may be associated with an Xcast area. The UE may be configured with one or more service group based MCCHs. Indication of an MBS specific RNTI, the M-RNTI, on PDCCH may be used to inform UEs in RRC_IDLE, UEs in RRC_INACTIVE and UEs in RRC_CONNECTED about an MCCH information change. Furthermore, the notification change may indicate which service may be affected by the MCCH information change, e.g., by indicating the list of TMGIs impacted. The MCCH change notification may be done in multiple ways. For example, a new RNTI specific to one or more services (e.g., TMGIs) may be configured into the UE, and more than one such new RNTI may be configured per MCCH. In the case that more than one xcast area is controlled by a MCCH, the MCCH may change notification, e.g., indicating which xcast area is affected.

Indication of an MBS specific RNTI per xcasting area and per service type or service group (i.e. MBS specific RNTI per group of services or per service type within an Xcast area), denoted herein as MC-RNTI (for multi-cell xcasting) on PDCCH or MPDCCH, may be used to inform UEs in RRC_IDLE, UEs in RRC_INACTIVE and UEs in RRC-_CONNECTED about an MCCH information change. Similarly, indication of an MBS specific RNTI per xcasting area and per service type or service group (i.e. MBS specific RNTI per group of services or per service type within an Xcast area), denoted herein as SC-RNTI (for single-cell xcasting) on PDCCH, may be used to inform UEs in RRC_IDLE, UEs in RRC_INACTIVE and UEs in RRC-_CONNECTED about an MCCH information change.

In another embodiment, a UE may be configured with one or more MCCHs within an Xcast area, wherein an MCCH may be used to configure, schedule or control one MBS service or a group of MBS services, the MCCH notification change may be signaled to the UE on a per MCCH basis, i.e. for an Xcasting area, a notification change may not be common to all MCCHs. A UE may monitor for a MCCH notification change on a per MCCH basis, wherein a change notification may be MCCH specific. A bitmap may be used to represent one or more MCCHs configured (for example through system information broadcast) into a UE, wherein each bit of the bitmap represents an MCCH configured into the UE. The length of the bitmap may be different from the number of MCCHs configured into the UE per Xcast area, or configured into the UE for all Xcast areas configured into the UE. In such case, a separate information element may be signaled to the UE by the base station, to indicate the association of the relative position of a bit within the bitmap, to a relative position of an MCCH within a list of MCCH configured into the UE, wherein such a list of MCCH may be configured into the UE, for example per Xcasting area or independent of Xcasting area. In this embodiment, a single MBS specific RNTI per Xcast area may be used to inform a UE about an MCCH information change for any of the MCCH configured into the UE. In this case, different MCCH reception resources (for example in the frequency domain or in the time domain), may be configured into a UE for different MCCHs.

In yet another embodiment, a single MCCH may be used to configure, schedule or control all MBS services within an Xcast area, wherein the MCCH configuration into the UE may include one or more MCCH information change notification configuration parameter sets (for example MCCH modification cycle and MCCH repetition cycle), and wherein an MCCH information change configuration parameter set is associated with an MBS service or MBS service group that is a subset of all MBS services within an Xcast area. A bitmap may be used to represent one or more MCCH information change notification configuration parameter sets, configured (for example through system information broadcast) into a UE, wherein each bit of the bitmap represents an MCCH information change notification configuration parameter set configured into the UE. The length of the bitmap may be different from the number of MCCH information change configuration parameter sets configured into the UE per Xcast area, or configured into the UE for all Xcast areas configured into the UE. In such case, a separate information element may be signaled to the UE by the base station, to indicate the association of the relative position of a bit within the bitmap, to a relative position of an MCCH information change notification configuration parameter set within a list of MCCH information change notification configuration parameter sets configured into the UE, wherein such a list of MCCH information change notification configuration parameter sets may be configured into the UE, for example per Xcast area or independent of Xcast area.

According to some aspects, in the case of a single MCCH, the MCCH configuration may configure the UE with one or more MCCH information change notification configurations parameter sets. The MCCH information change notification configurations parameter sets may be configured per service, per service type, per group of services, or per group of service types. Each of these sets may have different values for the modification cycle and repetition cycle. Furthermore, each MCCH information change notification occasion notification parameter set may include for, e.g., a repetition coefficient, a radio frame offset and a subframe index. To simplify the description, in the following it may be assumed that the parameter sets are per MBS service and that each of the parameter sets have the same radio frame offset and a subframe index. The UE may implicitly or autonomously determine the one or more common notification occasions. For example, it may determine a common repetition cycle as the shortest repetition cycle from among the configured MCCH information change notification configurations parameter sets. At each repetition cycle, the UE knows the MBS services for which it expects notifications. It may also check the modification period associated with that service The notification on PDCCH or MPDCCH may indicate which of the MCCHs may change, which may be done by means of a bit bitmap (e.g., 8-bits bitmap for MC-MCCH, and 2-bits bitmaps for SC-MCCH), for example. In one aspect, within this bitmap, the bit at a given position in the bitmap—for example, the position indicated by a field notificationIndicator within the bitmap—may be used to indicate changes for the one or more xcast area associated with the MCCH which corresponds to that bit position in the bitmap: if the bit is set to "1", the corresponding MCCH will change.

For example, the bitmap could be used to indicate change for specific MBS service in addition to indicating change to MBS service area. For example, assuming the use of a bitmap, within the bitmap, the bit at a given position in the bitmap—e.g., at the position indicated by a field notificationIndicator within the bitmap—may be use to indicate changes for that MBS xcast area as well as changes to a service or group of services. For example, service with similar latency requirements may be grouped together through configuration. Such grouping may be signaled to the UE. Super TMGI (STMGI) that address one or more TMGI may be used to address service grouping. Alternatively, the bit at the position indicated by the field notificationIndicator, may be used to indicate changes for that MBMS xcast area as well as change to service type. In this alternative, service type may be defined for example mMTC service type, URRLC service type or eMBB service type. An MBMS service (TMGI) belong to only once service type. Association between service and service type may be configured into the UE. Furthermore, a service Type TMGI like an STMGI defined above may be used. A service type identifier may also be predefined in the specification. Alternatively, the UE may be able to autonomously derive an MBMS service type identity from the MBMS service identity, e.g., for TMGI.

In NR, MCCH information change notification on PDCCH or MPDCCH may be transmitted periodically on any subframe. Furthermore, a CORESET specific to the change notification may be configured into the UE. A specific RNTI, e.g., per xcasting area and per service type or service group, that is an RNTI dedicated to announcing MCCH information change notification may be used to scramble the PDCCH transmission or MPDCCH transmission.

In NR, the MCCH information change notification occasions might not be common for all MCCHs. Instead, the UE may be configured with one or more MCCH information change notification occasions. For example, MCCH information change notification occasions may be configured per service type (e.g., URRLC, mMTC, or eMBB), group, or services as defined above. The one or more MCCH configurations may be configured into the UE wherein each MCCH information change notification occasion notification parameters may include, e.g., a repetition coefficient, a radio frame offset, or a subframe index. Alternatively, the UE may implicitly or autonomously determine the one or more common notification occasions based on the MCCH with the shortest modification period among the modification periods of all the MCCHs mapped or associated with the services, service type, or group of services of interest to the UE. In other words, for each group of service, or service type of interest, the UE may be configured with an MCCH. The UE may determine the associated notification occasion based on the corresponding MCCH modification period. If the UE is interested in receiving more than one service type, or more than one group of services, then the UE may determine common notification occasions based on the MCCHs with the shortest modification period among the modification periods of all the MCCHs mapped or associated with the services, service type, group of services of interest to the UE, or with service being received by the UE.

A UE that is receiving an MBS service via MRB (MBS Radio bearer), may be of any of the type defined herein, may acquire the MCCH information from the start of each modification period. When service of interest change or received service change, and such change translates into change of service types or service groups being received by the UE or translated into service types of service groups of interest to the UE, the UE may determine or calculate a new common notification occasion (as discussed above, that is based on the MCCH with the shortest modification periods among all the modification periods of service of interest or being received by the UE); and the UE shall acquire information from the start of each modification period according to the new modification period.

In support of MCCH information acquisition, in an aspect, the MCCH information acquisition procedure may overwrite any stored MCCH information, i.e., delta configuration may be not applicable for MCCH information and the UE may discontinue using a field if it is absent in MCCH information, unless explicitly specified otherwise. In another aspect, Delta configuration may be specified and applied for MCCH configuration.

New trigger for MCCH acquisition, disclosed herein, comprises: change of configuration to BWPs into the UE, switching of active BWP, UE enters a new RAN xcast area, or any other new MBS area to be specified.

MBS Xcast radio Bearer configuration. In an aspect, a new MBS xcast radio bearer configuration procedure may be specified, that may be used by the UE to configure xcast radio bearer such as non-SFN MC-PTM bearer, SFN MC-PTM bearer, or SC-PTM bearer, that may comprise configuration of SDAP, PDCP, RLC, MAC, or the physical layer upon starting and/or stopping to receive an MRB. The procedure may apply to UEs that may be interested to receive one or more MBS services. A single common procedure may be specified for the configuration of the various types of MBS bearers defined herein. Alternatively, a new MBS radio bearer configuration procedure may be specified for each MBS bearer type.

It should be noted that the PDCP configuration may or may not include security or header compression related configuration information. However, the PDCP configuration may include configuration in support of the following PDCP functions: transfer of data (user plane or control plane); maintenance of PDCP SNs; timer based SDU discard; for split bearers and DAPS bearer, routing; duplication; reordering and in-order delivery; out-of-order delivery; or duplicate discarding.

MRB Establishment and MRB release Procedures. The UE may apply the MRB establishment procedure to start receiving a session of a service it may have an interest in. The procedure may be initiated, e.g., upon start of the MBS session, upon (re-)entry of the corresponding xcast service area, upon becoming interested in the MBS service, upon removal of UE capability limitations inhibiting reception of the concerned service, upon BWP switching, i.e., new bearer may be configured with configuration associated with this BWP and the old bearer configuration may be release. It is possible that the new configuration may only be a physical layer related configuration.

The UE may release the MBR upon BWP switching, i.e., the bearer configuration associated with the old BWP shall be released. It is possible that the released configuration may be PHY related.

Upon MRB release, the UE may release the SDAP entity, the PDCP entity, the RLC entity as well as the related MAC and physical layer configuration; and may inform upper layers about the release of the MRB by indicating the corresponding TMGI and sessionId.

MBS Counting. For UE in RRC_Inactive, the RAN paging may indicate that the reason for paging is for MBMS counting. In addition to be configured with UE specific paging occasions, the UEs may also be configured with a common paging occasion in support of paging for MBS counting request. UE interested in MBS service may monitor such paging occasion. The UE may use RRC Resume request message or RRC Resume Request1 message to respond to paging. In response to paging, for example using RRC Resume request message or RRC Resume Request1 message, the UE may include in the paging response message, the MBMS counting Response, for example in a container as a piggyback on the paging response message. Alternatively, the UE may include the contents that make up the MBS counting response message into the paging response message. If the UE is not in RRC_CONNECTED state when the MBMS counting request is received, then it may transition to the RRC_CONNECTED state. In an aspect, the UE may transmit the paging response message in RRC_INACTIVE state without transition to RRC_CON-NECTED state.

In NR, an Xcast-AreaInfoList may be defined, wherein the list may contain the information required to acquire the MBS control information associated with one or more Xcast areas wherein the xcast areas may be of different type. Different range of xcast area identities or structure of xcast area identities may be defined to allow the UE to determine from the xcast area identity, the xcast area type. In an aspect, an Xcast-AreaInfoList may be defined, wherein the list may contain the information required to acquire the MBS control information associated with one or more Xcast areas, wherein the xcast areas may be of the same type. The list of Xcast area information, including Xcast area identities, may be configured into the UE by the network over RRC broadcast signaling. The UE may discover the list of Xcast area information, including Xcast area identities from RRC broadcast signaling.

The MBS counting request may be used by the RAN to count the UEs that are receiving or interested to receive specific MBS services. The UE may receive MBS counting request in an RRC_IDLE state, an RRC_INACTIVE state, or an RRC_CONNECTED state. The counting request may include a list of MBS services for which a counting may be requested, wherein each service may be identified by a TMGI. The MBS counting response message may be used by the UE to respond to an MBS counting request message. The UE may transmit MBS counting response message in an RRC_CONNECTED state. The UE may also transmit MBS counting response message in an RRC_INACTIVE state. The UE, in an RRC_IDLE state or an RRC_INACTIVE state, responding to MBS counting request message, may transition to an RRC_CONNECTED state. For UE in an RRC_INACTIVE state, the UE may transmit RRC counting response message without transitioning to an RRC_CON-NECTED state. The MBS service counting response message includes the list of MBS services, which the UE may be receiving or may be interested to receive. Value "0" in the list may correspond to the first entry in a counting request list within the MBS counting request message, value "1" may correspond to the second entry in this list and so on. The MBS counting response message may also include a list of xcast area index, wherein the index may correspond to the index of the entry in the list of xcast area configured into UE, for example, through an RRC system information message.

In a case where separate xcast area info list is used per xcast type, the response may additionally include the xcast area type, in order to allow the index to be properly correlated in the network to the correct xcast area info list provided to UE in the MBS counting request. In a case where separate xcast area info list is used per xcast type, the response may additionally include the xcast area type, in order to allow the index to be properly correlated in the network to the correct xcast area info list provided to UE in the MBS counting response.

MBS Interest Indication. BWP switching event in the UE may trigger MBS interest indication to the network. An MBS interest indication procedure may be used by the UE to inform the network that the UE may be receiving or may be interested to receive MBS service(s) via an MBS Radio Bearer (MRB), such as non-SFN MC-PTM bearer, SFN MC-PTM bearer, or SC-PTM bearer; and if so, to inform the network about the priority of MBS versus unicast reception or MBS service(s) reception in receive mode only.

The UE may use BWP configuration as part of the criteria to determine MBS frequency of interest. For example, a UE may consider an MBS frequency as MBS frequency of interest, if the following conditions are fulfilled. First condition, at least one MBS session the UE is receiving or interested to receive via an MRB (e.g., non-SFN MC-PTM bearer, SFN MC-PTM bearer, or SC-PTM bearer) is ongoing or about to start. Second condition, the BWP(s) configured on this frequency (e.g., being broadcast as part of this frequency configuration) include at least one BWP configured into the UE for MBS reception on the concerned frequency.

According to some aspects, broadcast services are typically transmitted in the xcast area defined by the service provider. In one option, the network may broadcast the services in the entire xcast area, regardless of whether or not there are any UEs interested in the service. In another aspect, the network may only broadcast the service in those cells where there is an interest in the service. Each gNB may use the MBS counting procedure to determine the number of UEs interested in the broadcast service in each of the gNB cells. An issue may occur for UEs in RRC_IDLE and RRC_INACTIVE, as these UEs change serving cell.

To keep the network aware of the UEs interested in receiving broadcast service, include one or more of the following features may included in one or more aspects:

UE interested in such services may be configured to signal a cell reselection to the network;

The xcast area may be divided into one or more broadcast notification areas. Each broadcast notification area may be identified by a Broadcast Notification Area Identifier (BNAI). As long as the cell reselection results in the UE staying in the same broadcast area, the UE need not notify the network. If the UE moves to a different broadcast notification area (e.g., as identified by a different BNAI), the UE signals the cell reselection to the new serving cell;

UE may be configured to periodically signal its current serving cell, to the network.

The UE may signal the change in serving cell through a new RRC message or through an MBS Interest Indication.

MBS Paging

According to an aspect, a UE may receive MBS services (both broadcast and multicast) in RRC_CONNECTED, RRC_INACTIVE, and RRC_IDLE states.

According to some aspects, broadcast services may be started and stopped. The MCCH notification mechanism may be used to signal such start and stop indications. In addition, a paging mechanism may be used to signal to UEs to start or to stop monitoring the MCCH logical channel. The paging message may be to a dedicated group RNTI or it may be to the Paging RNTI. In addition, the paging message may include information about the broadcast service for which the paging message is sent. The Paging message may include an indication to tell the UEs whether the broadcast service is starting or stopping. The Paging message may include a list of TMGI. In some aspects, the system information may include a list of broadcast services that are available in a cell. These may be identified through the TMGI, or through some other unique identifier. The paging message may then include a bitmap or codepoint tied to this list. For example a '1' in bit position k indicating that the k'th broadcast service in the list is starting or stopping. The Paging message may include a list of MCCH logical channel which the UEs should start or stop monitoring. In some aspects, the system information may include a list of MCCH logical channels available in a cell. The paging message may then include a bitmap or codepoint tied to this list. For example a '1' in bit position k indicating that the UES should start or stop monitoring the k'th MCCH logical channel.

According to some aspects, multicast service may be in one of 2 states: INACTIVE to ACTIVE. When a multicast service is INACTIVE, UEs may keep the MBS radio bearer configuration associated with the MBS service, but maintain the bearer in a suspended or inactive state. In addition, when a multicast service is INACTIVE, the RRC state of the UEs may transition to RRC_INACTIVE and RRC_IDLE. These UEs then need to be notified when the multicast service subsequently transitions to ACTIVE. This may be achieved through a Paging message. The paging message may be to a dedicated group RNTI or it may be to the Paging RNTI. The paging message may include a list of TMGI that are transitioning to ACTIVE. In an aspect, the system information may include a list of multicast services that are available in a cell. These may be identified through the TMGI, or through some other unique identifier. The paging message may then include a bitmap or codepoint tied to this list. For example a '1' in bit position k indicating that the k'th multicast service in the list is transitioning to ACTIVE. As part of this Paging message, the network may include one or more types of information:

a first type of information indicating that the UEs should start monitoring the PTP bearer to receive the multicast service;

a second type of information indicating that the UE should start monitoring the PTM bearer to receive the multicast service;

a third type of information indicating that the UE should start monitoring the split bearer to receive the multicast service;

a fourth type of information indicating which leg of a split bearer the UE should start monitoring the split bearer to receive the multicast service;

a fifth type of information indicating the state the UE may receive the multicast service. For example, the network may ask that the UEs should move to RRC_CON-NECTED state to receive the multicast service; and/or a sixth type of information indicating that the UE should send an MBS Interest Indication to the network.

According to some aspects, when a multicast service transitions to INACTIVE, it may be advantageous to notify the UEs that the service is transitioning to INACTIVE. This may be achieved through a Paging message. The paging message may be to a dedicated group RNTI or it may be to the Paging RNTI. The paging message may include a list of TMGI that are transitioning to INACTIVE. In an aspect, the system information may include a list of multicast services that are available in a cell. These may be identified through the TMGI, or through some other unique identifier. The paging message may then include a bitmap or codepoint tied to this list. For example a '1' in bit position k indicating that the k'th multicast service in the list is transitioning to INACTIVE. As part of this Paging message, the network may include one or more types of information:

a first type of information indicating that the UEs should clear the radio bearer information for the multicast service;

a second type of information indicating that the UEs should maintain the radio bearer information for the multicast service, but keep the bearer as suspended or inactive Time Scale of MBS Scheduling and a More Dynamic Xcasting Area Management.

MBS Scheduling Time Scale. Aspects disclosed herein provide techniques that overcome limitations of the legacy MBMS design, as described herein.

The time scale of the scheduling of MRB transport channel, such as MCH or DL-SCH, may be in units of radio frame, radio subframe, slot, or mini-slot. The time scale of the scheduling of the signal control channel, for example MCCH, may be in units of radio frame, radio subframe, slot, or mini-slot. The time scale of the scheduling of the traffic channel, such as MTCH, may be in units of radio frame, radio subframe, slot, or mini-slot.

Aspects disclosed herein describe the concept of radio System Time Unit (STU), wherein the radio STU may be a radio frame unit, a radio subframe unit, radio time-slot unit, or radio mini time-slot unit (or interchangeably time mini-slot unit), i.e., different granularity of STU may be specified. Similarly, a radio subSTU may be specified, wherein the STU may comprise one or more subSTU. For example, an STU may be a radio frame and a subSTU may be a radio subframe, a radio time-slot, a radio time mini-slot, or one or more time-symbols. Similarly, an STU may be a radio subframe, while a subSTU may be a radio time-slot, a radio time mini-slot, or one or more time-symbols. Furthermore, an STU may be a radio time-slot while a subSTU may be a time mini-slot, or one or more time-symbols.

A system numbering may be associated with an STU. For example, each STU may be referenced by an identifier that may be the STUN (System Time Unit Number). Taking as an example a radio STU as a radio frame, the STUN may be same as SFN (System Frame Number) with range, for example, from 0 to 1023, i.e., 1024 radio frame number or STU in the numbering scheme with a wrap around after 1023.

In an aspect, not all subSTU within an STU may be usable for MBS service. The usable subSTU may be configurable and may be configured into the UE, for example, by the network. The following parameters may be configured into the UE for the usable subSTU allocations.

STU allocation period and STU allocation offset, STUs that contain usable subSTUs may occur when equation STUN mod STU_Allocation_Period=STU_Allocation_Offset is satisfied, wherein the parameter STU_Allocation_Period refers to the STU allocation period, and the parameter STU_Allocation_Offset refers to STU allocation offset. This may be defined as an enumeration. For example, the value n1 for STU allocation period denotes value 1, n2 denotes value 2, and so on. When k consecutive STUs as defined below are used for the allocation of usable subSTUs, the equation defines the first radio STU referred to in the description below.

subSTU allocation, may define the subSTUs that may be allocated as usable MBS services within the radio STU allocation period, defined by the parameters STU_Allocation_Period and the STU_Allocation_Offset.

The configuration of usable subSTU by MBS services, may be configured within the STU allocation period on the basis of a set of k consecutive STUs, wherein k is a divisor of the STU allocation period, i.e., there is an integer number m such that k times m (i.e., k*m) is equal to the STU allocation period, i.e, the STU allocation period may be divided by k with no remainder. In one example k may be 1. In another example, k may be 4. The set of k consecutive STUs may be represented in the form of bitmap. For example, assuming q is the number of subSTUs usable within an STU, then the length of the bitmap may be k times q (i.e., k*q). The usable subSTUs within an STU may not be consecutives.

Scheduling of MCCH for MRB. The scheduling of an MCCH may include one or more of the followings.

List of Xcast area identities (IDs), wherein the list may comprise of one or more ID. It should be noted that in the actual definition of the Information Element (IE), there may not be a separate list of xcast area IDs, but rather a list of structures, wherein each structure comprises one or more xcast area IDs, and the related MCCH configuration parameters are defined herein.

Association between xcast area ID(s) and MCCH, wherein the association may be a one xcast area to one MCCH association, more than one xcast areas to one MCCH association, or one xcast area to more than one MCCHs association.

Association between xcast area type and MCCH, wherein the association may be a one xcast area type to one MCCH association, more than one xcast area types to one MCCH association, or one xcast area type to more than one control MCCHs association.

MCCH modification period, may define periodically appearing boundaries, i.e., STU or subSTU, for which STUN (System Time Unit Number) mod mcch-ModificationPeriod=0. The contents of different transmissions of MCCH information may be different, if there is at least one such boundary in-between them. The parameter mcch-ModificationPeriod is the MCCH modification period.

The MCCH offset, may indicate together with the mcch-RepetitionPeriod, the radio STUs in which MCCH may be scheduled, i.e., MCCH may be scheduled in radio STUs for which STUN mod mcch-RepetitionPeriod=mcch-Offset. The parameter mcch-RepetitionPeriod may be the MCCH repetition period.

MCCH repetition Period, may define the interval between transmissions of MCCH information, in radio STUs, for example, Value stu32 corresponds to 32 STUs, stu64 corresponds to 64 radio STUs and so on.

subSTU Allocation information, may indicate the subSTUs of the STUs indicated by the mcch-RepetitionPeriod and the mcch-Offset, that may carry MCCH. It may be encoded as a bitmap. Value "1" may indicate that the corresponding subSTU is allocated. The following mapping may apply. In an aspect, the first/leftmost bit defines the allocation for subSTU #1 of the radio STU indicated by mcch-RepetitionPeriod and mcch-Offset, the second bit for subSTU #2, the third bit for subSTU #3, the kth bit for SubSTU #x, the mth bit for subSTU #n, wherein the radio STU comprises of n subSTU that may carry MCCH. Furthermore, some bits in the bitmaps may not be used, for example the one or more bits in the bitmap may not be used. In one aspect, these subSTU may be consecutive. In another aspect, the subSTUs may not be consecutive.

Signaling Modulation and Coding Scheme (MCS), may indicate the MCS applicable for the subSTUs indicated by the field subSTU allocation information and for each (P)MCH that is configured for the one or more xcast area associated with this MCCH, for the first subSTU allocated to the (P)MCH within each TrCH scheduling period (which may contain the TrCH scheduling information provided by MAC). The MCS set or list may comprise of a list of indexes wherein each index point to an entry in a physical layer table wherein each entry corresponds to one or more MCSs or type of MCSs and a transport block size (TBS). In an aspect, the signaling MCS set may include a list of entries wherein each entry may include one or more MCSs or type of MCSs and a corresponding TBS.

Subcarrier spacing information, may indicate the subcarrier spacing(s) for xcast subSTUs. In an aspect, this information may include only one subcarrier spacing value.

BWP, may indicate the BWP(s) for the xcast subSTUs. In an aspect, this information may include only one BWP value.

Beam Sweeping, may indicate the information related to the beam sweeping for the transmission. This may include the number of beams that should be swept, the duration of each sweep, the duration of each transmission within a sweep, or the starting direction for the sweep for each transmission.

Notification Indicator, may indicate which PDCCH or MPDCCH bit is used to notify the UE about change of the MCCH applicable for this xcast area. Value 0 corresponds with the least significant bit, and so on. Note that in the present disclosure, the term PDCCH or MPDCCH are used interchangeably, unless otherwise specified.

Notification offset, may indicate, together with the notification repetition period, the radio STU in which the MCCH information change notification may be scheduled, i.e., the MCCH information change notification may be scheduled in radio STUs for which STUN mod notification repetition period=notification offset.

Notification Repetition Period, may be actual change notification repetition period common for all MCCHs that are configured=shortest modification period/notification Repetition Period. In an aspect, the 'shortest modification period' corresponds with the lowest value of MCCH Modification Period of all MCCHs that are configured. In an aspect, the "shortest modification period" may correspond with the lowest value of MCCH Modification Period of all MCCHs for a service type or group for services. The values may be in the form of an enumeration. In aspects of Xcasting disclosed herein (e.g., SC-PTM xcasting or non-SFN MC-PTM xcasting), the notification might not be periodic. Instead, the notification may be sent in a subSTU, for example, the first subSTU in a repetition period where the MCCH can be scheduled. The notification may be scrambled using an RNTI specified for the xcast type, the service type, group of service type, the xcast area type, or a combination thereof.

Notification subSTU Index, may indicate the subSTU used to transmit MCCH change notifications on PDCCH. In an aspect, subSTU Index #1 corresponds to subSTU #1, subSTU index #2 corresponds to subSTU #2, subSTU index #k corresponds to subSTU #x, and subSTU index #m corresponds to subSTU #n, wherein the radio STU comprises of n subSTU that may carry MCCH. In an aspect, these subSTU may be consecutive. In another aspect, the subSTUs may not be consecutive.

PDCCH subband or narrowband information.

Number of repetitions of PDCCH, may be the maximum number of PDCCH repetitions the UE may need to monitor for MCCH.

Starting subSTU of the PDCCH search space.

Frequency hopping configuration of the PDCCH/(P)TrCH.

(P)TrCH repetition number or an index of a maximum value pointing to a set of (P)TrCH repetition numbers. There may be different values signaled by the network (for example broadcasted by the network), e.g., for a different coverage level or a different coverage compensation level, as a result of UEs with different capability levels, such as different reduced capability levels.

DRX inactivity Timer, may be a timer for listening to MCCH scheduling. The value may be in number of subSTUs. For example, Value psS0 corresponds to 0 PDCCH subSTU, psS1 corresponds to 1 PDCCH subSTU and so on.

On Duration Timer, may indicate the duration in subSTUs during which MCCH may be scheduled in PDCCH subSTUs.

Scheduling Cycle for DRX of PDCCH, may be subject to the corresponding Multi-cell xcasting or single cell xcasting RNTI.

Scheduling Offset for DRX PDCCH, may be subject to the corresponding Multi-cell xcasting or single cell xcasting RNTI.

MCCH Carrier Frequency, may be a Downlink carrier used for the xcasting of MCCH transmissions. This information may be, for example, broadcasted in SIB dedicated for the configuration of MBS into the UE. Alternatively, the UE may discover the carrier frequency for MBS operation as part of the MIB, for example, a MIB that is dedicated for the configuration of MBS into the UE.

MCCH duration, may indicate, starting from the subSTU indicated by MCCH First subSTU, the duration in subSTUs during which MCCH may be scheduled in PDCCH subSTUs. Absence of this information may mean that MCCH is only scheduled in the subSTU indicated by MCCH First SubSTU.

MCCH First SubSTU, may indicate the first subSTU in which MCCH is scheduled.

PDCP configuration.

RLC configuration, may include configuration information such as RLC mode for, e.g., Unacknowledge Mode (UM), RLC sequence number, and the re-ordering timer. The latter might be set to 0 with the implication that the timer shall be started and immediately expire unless explicitly stated otherwise.

MAC main Configuration (other than DRX related configuration).

Logical channel Configuration.

SRB Identity.

TMGI Information: this information may include the service identity (ID) and PLMN ID of the MBS services whose MBS control information are carried in this MCCH. The service ID may be used to uniquely identify to the UE the identity of an MBS service within a PLMN. The field may contain octet 3-5 of the Temporary Mobile Group Identity (TMGI). The first octet contains the third octet of the TMGI, the second octet contains the fourth octet of the TMGI and so on. The TMGI information may optionally be a list of service identity (ID) and PLMN ID.

RNTI (e.g., MCCH-RNTI) used to scramble the DCI scheduling an MCCH.

For each MBS service included in the TMGI Information, an indication if the MBS service is broadcast or multicast. For the multicast service, a further indication may be included to indicate if the service is ACTIVE or INACTIVE.

In an aspect, the network may configure into the UE, the MCCH schedule in a semi-static manner such as in system information broadcast signaling. Similarly, the UE may receive the MCCH schedule in a semi-static manner, such as in system information broadcast signaling. In another aspect the network may configure into the UE, MCCH schedule using a MAC control element (MAC CE). Similarly, the UE may receive the MCCH schedule over MAC CE. In yet another aspect, the network may configure into the UE, the MCCH schedule using a downlink physical layer control information (DCI). Similarly, the UE may receive the MCCH schedule over a physical layer DCI. One or more MCCH may be associated to an xcasting area with each assigned to one or more service type or group of services. Additionally, an MCCH may be mapped to more than one xcasting area. If this is case, the UE may be configured with which xcasting area to use and the corresponding resources to use for MBS service data (MTCH) reception. The network may dynamically schedule MRB resources including (P)TrCH resources to be used for service reception and different UE may be able to receive MBS services data with different MRB resources for the same MRB service within the same xcasting area.

Scheduling of (P)TrCH (in support of MTCH traffic) for MBR. The MBS control information applicable to an MBS xcasting area may include one or more of the following:

A list of subSTU allocation, SubSTU allocation period, and the list of radio bearers, wherein each bearer may be configured with one or more of the session information, including session ID, TMGI and the logical channel Identity for the corresponding MTCH, the SDAP configuration, the PDCP configuration, the RLC configuration, the logical channel configuration, the MAC configuration including DRX configuration, and the configuration of (P)TrCH, including TrCH MCS, Transport Block Size (TBS) scheduling period, End of subSTU allocation, radio bearer ID, etc.). Each of the parameters are further detailed below. It should be noted that as indicated earlier the TrCH is used in reference to MCH or DL-SCH. Similarly, (P)TrCH is being used herein in reference to PMCH or PDSCH. It should also be noted that the list of (P)TrCHs, for the subSTU allocation defined by the common subSTU allocation information and common subSTU allocation period, may be configured separately from the list of bearer configurations (without (P)TrCH information) that may include information such as session information including session ID, TMGI and the logical channel Identity for the corresponding MTCH, the SDAP configuration, the PDCP configuration, the RLC configuration, the logical channel configuration, the MAC configuration including DRX configuration, etc. The mapping between those bearer information and the (P)TrCHs in the configured (P)TrCH list may then be done in the UE based on specified rules, and or additional signaling from the network to indicate which (P)TrCH is being scheduled in a given subSTU.

Common SubSTU Allocation, may indicate the subSTUs allocated to the xcast area. The network may configure this information to cover at least the subSTUs configured (e.g., in system information broadcast) for the one or more MCCH for this xcast area, regardless of whether any xcast sessions are ongoing.

(P)TrCH Common SubSTU allocation Period, may indicate the period during which resources corresponding with the common subSTU allocation are divided between the (P)TrCH that are configured for this xcast area. The subSTU allocation patterns, as defined by common SubSTU Allocation, may repeat continuously during this period. For example, value rSTU4 corresponds to 4 radio STUs, rSTU8 corresponds to 8 radio STUs and so on. The common subSTU allocation Period starts in the radio STUs for which STUN mod common_SubSTU_Allocation_Period=0, wherein the parameter common_SubSTU_Allocation_Period denotes the common subSTU allocation period.

(P)TrCH subSTU Allocation End, may indicate the last subSTU allocated to this (P)TrCH within a period identified by the common subSTU allocation period. In an aspect, the subSTUs allocated to (P)TrCH corresponding with the nth entry in the list of (P)TrCH are the subsequent subSTUs starting from either the next subSTUs after the subSTUs identified by the parameter subSTU allocation end of the (n−1)th listed (P)TrCH or, for n=1, the first subSTU defined by the field or parameter Common subSTU allocation, through the subSTU identified by the field or parameter Common subSTU allocation of the nth listed (P)TrCH. Value 0 corresponds with the first subSTU defined by the parameter or field common subSTU allocation. In this aspect, the subSTUs scheduled for a given (P)TrCH do not overlap with the subSTUs scheduled for another (P)TrCH. In another aspect, in a scheduling scheme, the subSTUs scheduled for a given (P)TrCH may overlap with the subSTUs scheduled for another (P)TrCH. In other words, no requirement for the (P)TrCH of the same xcasting area, which are multiplexed in the same common subSTU allocation period to be transmitted in consecutive order within the common subSTU allocation period. This provides a flexible scheduling and may be more efficient in meeting MBS service latency requirement.

Data MCS, may indicate the MCS applicable for the subSTUs indicated by the field Common subSTU allocation information. The MCS set or list may comprise of a list of indexes, wherein each index may point to an entry in a physical layer table, and wherein each entry may correspond to one or more MCSs or type of MCSs and a transport block size (TBS). In an aspect, the MCS set may include a list of entries, wherein each entry may include one or more MCSs or type of MCSs and a corresponding TBS. In another aspect, the MCS may not apply to the subSTUs that may carry MCCH, i.e., the subSTUs indicated by the MCCH subSTU allocation information configured into the UE, for example, using system information broadcast, and it may also not apply for the first subSTU allocated to this (P)TrCH within each (P)TrCH scheduling period (which may contain the TrCH scheduling information provided by MAC).

(P)TrCH Scheduling Period, may indicate the (P)TrCH scheduling period, i.e., the periodicity used for providing (P)TrCH scheduling information at lower layers (e.g., MAC or PHY) applicable for a (P)TrCH. For example, value STU8 corresponds to 8 radio STUs, STU16 corresponds to 16 radio STUs and so on. The (P)TrCH scheduling period may start in the radio STUs for which STUN mod (P)TrCH-SchedulingPeriod=0, wherein (P)TrCH-SchedulingPeriod may be used to denote the (P)TrCH scheduling period. In an aspect, the network may configure (P)TrCH-SchedulingPeriod of the (P)TrCH listed first in the list of (P)TrCHs to be smaller than or equal to MCCH repetition period. This may be used to allow the possibility to configure different transport block sizes for subsequent (P)TrCH.

Session Information, may include the Session Identity, the TMGI, and the logical channel Identity. The session identity may be optionally used to indicate to the UE the MBS Session Identity, which together with TMGI may identify a transmission or a possible retransmission of a specific MBS session. The session identity may be provided to the UE whenever upper layers have assigned a session identity, i.e., one is available for the MBMS session in the network, i.e., the radio access network.

TMGI Information, may be the service identity (ID) and PLMN ID. The service ID may be used to uniquely identify to the UE the identity of an MBS service within a PLMN. The field may contain octet 3-5 of the Temporary Mobile Group Identity (TMGI). The first octet may contain the third octet of the TMGI, the second octet may contain the fourth octet of the TMGI and so on. The TMGI information may optionally be a list of service identity (ID) and PLMN ID.

(P)TrCH Subcarrier spacing information, may indicate the subcarrier spacing(s) for xcast subSTUs. In an aspect, this information may include only one subcarrier spacing value.

(P)TrCH BWP, may indicate the BWP(s) for the xcast subSTUs. In an aspect, this information may include only one BWP value.

PDCCH subband or narrowband information.

(P)TrCH Beam Sweeping, may indicate the information related to the beam sweeping for the transmission. This may include the number of beams that should be swept, the duration of each sweep, the duration of each transmission within a sweep, or the starting direction for the sweep for each transmission.

Number of repetitions of PDCCH, may be the maximum number of PDCCH repetitions the UE may need to monitor for MTCH.

Starting subSTU of the PDCCH search space.

Frequency hopping configuration of the PDCCH/(P)TrCH.

(P)TrCH repetition number, or an index of a maximum value pointing to a set of (P)TrCH repetition numbers. There may be different values signaled by the network (e.g., broadcasted by the network), for example, for different coverage level, or different coverage compensation level as a result of UEs with different capability levels, such as different reduced capability levels.

DRX inactivity Timer, may be a timer for listening to MTCH scheduling. The value may be in number of subSTUs. For example, Value psS0 corresponds to 0 PDCCH subSTU, psS1 corresponds to 1 PDCCH sub-STU and so on.

On Duration Timer, may indicate the duration in subSTUs during which MTCH may be scheduled in PDCCH subSTUs Scheduling Cycle for DRX of PDCCH, may be subject to the corresponding Multi-cell xcasting or single cell xcasting RNTI.

Scheduling Offset for DRX PDCCH, may be subject to the corresponding Multi-cell xcasting or single cell xcasting RNTI.

MTCH Carrier Frequency, may be Downlink carrier used for the xcasting of MTCH transmissions. This information may be, for example, broadcasted in SIB dedicated for the configuration of MBS into the UE. Alternatively, the UE may discover the carrier frequency for MBS operation as part of the MIB, for example, a MIB that is dedicated for the configuration of MBS into the UE.

MTCH duration, may indicate, starting from the subSTU indicated by MTCH First subSTU, the duration in subSTUs during which MTCH may be scheduled in PDCCH subSTUs. Absence of this information may mean that MTCH is only scheduled in the subSTU indicated by MTCH First SubSTU.

MTCH First SubSTU, may indicate the first subSTU in which MTCH is scheduled.

PDCP configuration.

RLC configuration, may include configuration information such as RLC mode, e.g., Unacknowledge Mode (UM), RLC sequence number, and the re-ordering timer. The later might be set to 0 with the implication that the timer shall be started and immediately expire unless explicitly stated otherwise.

MAC main Configuration (other than DRX related configuration).

Logical channel Configuration.

DRB Identity.

RNTI, for example, gRNTI used to scramble the DCI scheduling an MTCH.

Neighbor Cell List, may indicate a list of neighbor cells where ongoing MBMS sessions provided via MRB in the current cells may also be provided. The MRB may be of any type defined herein. The neighbor cell list information may include carrier frequency and the physical cell identity of the cell. The carrier frequency may indicate the frequency of the neighbor cell indicated by physCellId. Absence of this information means that the neighbor cell is on the same frequency as the current cell.

For each MBS service included in the TMGI Information, an indication if the MBS service is broadcast or multicast. For the multicast service, a further indication may be included to indicate if the service is ACTIVE or INACTIVE.

Indication whether the MBS service or group of MBS services for which the MBS control information applies, requires the UE to be in RRC_CONNECTED mode.

Indication whether the MBS service or group of MBS services for which the MBS control information applies, may be received while UE is in RRC_IDLE or RRC_INACTIVE states.

Indication whether the MBS service or group of MBS services for which the MBS control information applies, requires Layer 1 HARQ feedback. If yes the MBS control information may include the details of the Layer 1 feedback. For example, if blind retransmissions are supported, if failed transmissions over a G-RNTI are retransmitted over a C-RNTI Indication whether the MBS service or group of MBS services for which the MBS control information applies, requires Layer 2 feedback. If yes, the MBS control information may include the details for the Layer 2 feedback.

For a MRB that is a split bearer (such as a SC-PTM split bearer) an indication if the MBS control information relates to the PTP leg and/or the PTM leg of the split bearer.

MBS session ID: an identifier of the MBS session. This may be used by the UE to link MBS control information for the MRB that are split bearers, and whose PTP leg control information is provided through dedicated signaling and whose PTM leg control information is provided through common signalling.

In an aspect, the network may configure into the UE, the (P)TrCH schedule in a semi-static manner such as in system information broadcast signaling. Similarly, the UE may receive the (P)TrCH schedule in a semi-static manner such as in system information broadcast signaling. In another aspect, the network may configure into the UE, (P)TrCH schedule using a MAC control element (MAC CE). Similarly, the UE may receive the (P)TrCH schedule over MAC CE. In yet another aspect, the network may configure into the UE, the (P)TrCH schedule using a downlink physical layer control information (DCI). Similarly, the UE may receive the (P)TrCH schedule over a physical layer DCI.

Scheduling of MTCH for MRB. In an aspect, the network may configure into the UE, the MTCH schedule in a semi-static manner such as in system information broadcast signaling. Similarly, the UE may receive the MTCH schedule in a semi-static manner such as in system information broadcast signaling. In another aspect, the network may configure into the UE, MTCH schedule using a MAC control element (MAC CE). Similarly, the UE may receive the MTCH schedule over MAC CE. In yet another aspect, the network may configure into the UE, the MTCH schedule using a downlink physical layer control information (DCI). Similarly, the UE may receive the MTCH schedule over a physical layer DCI.

MAC CE based MTCH scheduling. (P)TrCH transmission may occur in subSTUs configured by upper layer for MCCH or MTCH transmission. For each such subSTU, upper layer may indicate if MCCH (signaling) MCS or MTCH (data) MCS applies. The transmission of an (P)TrCH may occur in a set of subSTUs defined by (P)TrCH schedule as described above. An (P)TrCH Scheduling Information MAC control element may be included in the first subSTU allocated to the (P)TrCH within the (P)TrCH scheduling period to indicate the position of each MTCH and unused subSTUs on the (P)TrCH. In an aspect, if an extended list of configurations for radio bearers or configuration of (P)TrCHs is configured for an (P)TrCH, an Extended (P)TrCH Scheduling Information MAC control element is included in the first subframe allocated to the corresponding (P)TrCH within the (P)TrCH scheduling period to indicate the position of each MTCH and unused subframes on the (P)TrCH, and to indicate whether MTCH transmission is to be suspended. The MAC entity may assume that the first scheduled MTCH starts immediately after the MCCH (scheduling the (P)TrCH or the (P)TrMCH Scheduling Information MAC control element or the Extended (Pr)CH Scheduling Information MAC control element, if the MCCH is not present, and the other scheduled MTCH(s) start immediately after the previous MTCH, at the earliest in the subframe where the previous MTCH stops.

When the MAC entity may need to receive (P)TrCH, the MAC entity shall attempt to decode the TB on the (P)TrCH; and, if a TB on the (P)TrCH has been successfully decoded, demultiplex the MAC PDU and deliver the MAC SDU(s) to upper layers. When the MAC entity receives the Extended MCH Scheduling Information MAC control element, the MAC entity may indicate the MTCH(s) to be suspended to the upper layers. The MAC entity may continue receiving (P)TrCH until the MTCH is removed from the MCCH.

(P)TrCH based MTCH scheduling. (P)TrCH transmission may occur in subSTUs configured by upper layer for MCCH or MTCH transmission. For each such subSTU, upper layer may indicate if MCCH (signaling) MCS or MTCH (data) MCS applies. The transmission of an (P)TrCH may occur in a set of subSTUs defined by (P)TrCH schedule as described above. An (P)TrCH Scheduling Information DCI may be included in the first subSTU allocated to the (P)TrCH within the (P)TrCH scheduling period to indicate the position of each MTCH and unused subSTUs on the (P)TrCH. In an aspect, if an extended list of configurations for radio bearers or configuration of (P)TrCHs is configured for an (P)TrCH, an Extended (P)TrCH Scheduling Information DCI may be included in the first subframe allocated to the corresponding (P)TrCH within the (P)TrCH scheduling period to indicate the position of each MTCH and unused subframes on the (P)TrCH, and to indicate whether MTCH transmission is to be suspended. The PHY entity may assume that the first scheduled MTCH starts immediately after the MCCH (scheduling the (P)TrCH or the (P)TrMCH Scheduling Information DCI or the Extended (P)TrCH Scheduling Information DCI, if the MCCH is not present, and the other scheduled MTCH(s) start immediately after the previous MTCH, at the earliest in the subframe where the previous MTCH stops.

When the PHY entity may need to receive (P)TrCH, the PHY entity shall attempt to decode the TB on the (P)TrCH; and, if a TB on the (P)TrCH has been successfully decoded, deliver the MAC PDU(s) to upper layers.

The PHY entity may monitor the DCI scheduling a MTCH using an RNTI specified for the monitoring DCI scheduling a MTCH. Different RNTI may be specified, e.g., an MBR specific RNTI may be specified. In an aspect, an RNTI specific to a service type or specific to a group of service may be specified. When the PHY entity receives the Extended MCH Scheduling Information DCI, the PHY entity may indicate the MTCH(s) to be suspended to the upper layers. The PHY entity may continue receiving (P)TrCH until the MTCH is removed from the MCCH.

Exemplary Aspects of the Present Disclosure

MC-MBS. In general, the control information, relevant for UEs supporting MBS, may be separated as much as possible from unicast control information. Most of the MBS control information may be provided on a logical channel specific for MBS common control information: the MCSF-MCCH for SFN operation, and the MCMF-MCCH for non-SFN operation, collectively referred to as MCCH. NR RAN may employ one MCCH logical channel per Xcast area. Alternatively, NR RAN may employ multiple MCCH logical channel per Xcast area. MBS xcasting area may be introduced at the RAN level RXA (RAN Xcast area). The RXA may be defined at multiple levels: at gNB level, a gNB Xcast area may be defined; at gNB-CU level, a CU-RXA may be defined; at gNB-DU level, DU-RXA may be defined. A mapping association may be defined between CU-RXA and DU-RXA, for example, CU-RXA may be a collection of DU-RXA.

In case the network configures multiple Xcast areas, the UE may acquire the MBMS control information from the MCCHs that may be configured to identify if services it is interested to receive are ongoing. The MCCH may carry the XcastAreaConfiguration message, which may indicate the MBS sessions that are ongoing as well as the (corresponding) radio resource configuration for one or multiple Xcast areas. The MCCH may also carry the MBMSCountingRequest message, when NR RAN wishes to count the number of UEs in RRC_CONNECTED that may be receiving or may be interested to receive one or more specific MBMS services.

A limited amount of MBS control information may be provided on the BCCH. This primarily concerns the information that may be needed to acquire the MCCH(s). This information may be carried by means of a single MBS specific SystemInformationBlock: SystemInformationBlockTypeX An Xcast area may be identified solely by the xcast-AreaId in SystemInformationBlockTypeX SystemInformationBlockTypeX may be provided for a given validity area where the UE does not need to acquire a new SystemInformationBlockTypeX while moving within the validity area. The NR SIB area scope mechanism may be reused to enable validity area for SystemInformationBlockTypeX At mobility, the UE may consider that the Xcast area is continuous when the source cell and the target cell broadcast the same value in the xcast-AreaId.

Aspects of MCCH Scheduling. The MCCH information may be transmitted periodically, using a configurable repetition period. Scheduling information for MCCH may be provided through MAC CE, PHY DCI, or not provided, i.e., both the time domain scheduling as well as the lower layer configuration may be semi-statically configured, as defined within SystemInformationBlockTypeX.

For MBS user data, which may be carried by the MCMF-MTCH or MCSF-MTCH logical channels (collectively MTCH logical channel), NR RAN may carry the MTCH over the MCH. In such a case, the NR RAN may need to provide time domain scheduling, frequency domain scheduling, as well as other lower layer configuration. The time domain scheduling may be periodically provided in MCH scheduling information (MSI) at lower layers (MAC). The MBS transmissions may be over one or multiple bandwidth parts. The BWP may be the same as that used for CORESET 0, or alternatively it may be different from that used for CORESET 0. The BWP for transmission may be provided as part of the MSI at the lower layers (MAC) or alternatively this may be semi-statically configured. The other lower layer configuration may be semi-statically configured. The periodicity of the MSI may be configurable and may be defined by the MCH scheduling period. Alternatively, NR RAN may carry the MTCH over the DL-SCH. In such a case, the NR RAN may need to provide time domain scheduling, frequency domain scheduling, as well as other lower layer configuration. The time domain scheduling may be provided over the PDCCH. The MBS transmissions may be over one or multiple bandwidth parts. The BWP may be the same as that used for CORESET 0, or, alternatively, it may be different from that used for CORESET 0. The BWP for transmission may be semi-statically configured. The other lower layer configuration may be semi-statically configured or signaled as part of the PDCCH.

Aspects of MCCH information validity and notification of changes. See FIG. 4A. The network may have to keep the UE informed when the MCCH information changes. Change of MCCH information may occur at specific radio frames, i.e., the concept of a modification period may be used. Within a modification period, the same MCCH information may be transmitted a number of times, as defined by its scheduling (which is based on a repetition period). The modification period boundaries may be defined by SFN values for which SFN mod m=0, where m is the number of radio frames comprising the modification period. The modification period may be configured by means of SystemInformationBlockTypeX. The network may maintain one or multiple MCCH. Each of these may have its MCCH modification period, with its own MCCH repetition period, and its own frame offset. Each MCCH may provide the control of one or more MBS services.

Figure 4A:
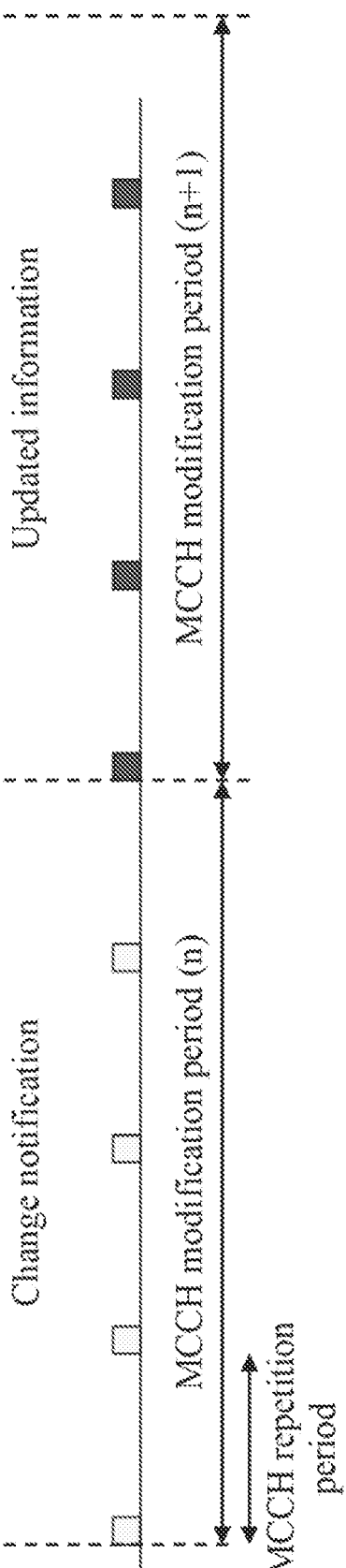
FIG. 4A illustrates change of MCCH information.

When the network changes (some of) the MCCH information, it may notify the UEs about the change during a first modification period. In the next modification period, the network may transmit the updated MCCH information. These general principles are illustrated in FIG. 4A, e.g., in which the illustrated MCCH information associated with MCCH modification period (n+1) may differ from the MCCH information associated with MCCH modification period (n). Upon receiving a change notification, a UE interested to receive MBS services may acquire the new MCCH information immediately from the start of the next modification period. The UE may apply the previously acquired MCCH information until the UE acquires the new MCCH information. The change notification may be indicated at the granularity of an Xcast area. Alternatively, the change notification may be indicated at the granularity of MBS service or group of service level within an Xcast area.

In a first alternative, indication of an MBS specific RNTI per xcasting area and per service type or service group, the M-RNTI, on PDCCH may be used to inform UEs in RRC_IDLE, UEs in RRC_INACTIVE, and UEs in RRC-_CONNECTED about an MCCH information change. A different M-RNTI may be defined for each MBS service or group of MBS services. When receiving an MCCH information change notification, the UE may know that the MCCH information will change at the next modification period boundary, for the indicated services if the M-RNTI are defined per MBS service or group of MBS services. The notification on PDCCH may indicate which of the MCCHs will change, which is done by means of an 8-bit bitmap. Within this bitmap, the bit at the position indicated by the field notificationIndicator may be used to indicate changes for that MBSFN area: if the bit is set to "1", the corresponding MCCH will change.

In a second alternative, indication of an MBS specific RNTI per xcasting area, the M-RNTI, on PDCCH may be used to inform UEs in RRC_IDLE, UEs in RRC_INACTIVE, and UEs in RRC_CONNECTED about an MCCH information change. When receiving an MCCH information change notification, the UE knows that the MCCH information will change at the next modification period boundary. The notification on PDCCH may indicate which of the MCCHs will change and which MBS service or group of MBS services that are affected. For example, the bitmap may be used to indicate change for specific MBS service in addition to indicating change to MBS xcast area. In other words, the bit at the position indicated by the field notificationIndicator, may be used to indicate changes for that MBS xcast area as well as changes to a service or group of services. For example, service with similar latency requirements may be grouped together through configuration. Such grouping may be signaled to the UE. Super TMGI (STMGI) that address one or more TMGI may be used to address service grouping. Alternatively, the bit at the position indicated by the field notificationIndicator, may be used to indicate changes for that MBS xcast area as well as change to service type. In this alternative, service type may be defined for example mMTC service type, URRLC service type or eMBB service type. An MBMS service (TMGI) may belong to only one service type. Association between service and service type may be configured into the UE. Furthermore, a service Type TMGI like an STMGI defined above may be used. A service type identifier may also be predefined in the specification. Alternatively, the UE may be able to autonomously derive an MBMS service type identity from the MBMS service identity for, e.g., TMGI.

No further details may be provided, e.g., regarding which MCCH information will change. The MCCH information change notification may be used to inform the UE about a change of MCCH information upon session start or about the start of MBMS counting.

The MCCH information change notifications on PDCCH may be transmitted periodically on any subframe. Furthermore, a CORESET specific to the change notification may be configured into the UE. A specific RNTI, e.g., per xcasting area and per service type or service group, i.e., an RNTI dedicated to announcing MCCH information change notification may be used to scramble the PDCCH transmission.

In a first alternative, the MCCH information change notification occasions may be common for all MCCHs that are configured, and may be configurable by parameters included in SystemInformationBlockTypeX a repetition coefficient, a radio frame offset, and a subframe index. These common notification occasions may be based on the MCCH with the shortest modification period.

In a second alternative, the MCCH information change notification occasions may not be common for all MCCHs. Instead, the UE may be configured with one or more MCCH information change notification occasions. For example, MCCH information change notification occasions may be configured per service type (e.g., URRLC, mMTC, or eMBB) or group or services as defined above. The one or more MCCH configurations may be configure into the UE, wherein each MCCH information change notification occasion notification parameters may include, e.g., a repetition coefficient, a radio frame offset and a subframe index. Alternatively, the UE may implicitly or autonomously determine the one or more common notification occasions based on the MCCH with the shortest modification period among the modification periods of all the MCCHs mapped or associated with the services or service type or group of services of interest to the UE. In other word, for each group of service or service type of interest, the UE may be configured with an MCCH. The UE may determine the associated notification occasion based on the corresponding MCCH modification period. If the UE is interested or receiving more than one service type or more than one group of services, then the UE may determine common notification occasions based on the MCCHs with the shorted modification period among the modification periods of all the MCCHs mapped or associated with the services or service type or group of services of interest to the UE or with service being received by the UE.

NOTE 1: an NR RAN may modify the MBS configuration information provided on MCCH at the same time as updating the MBS configuration information carried on BCCH, i.e., at a coinciding BCCH and MCCH modification period. Upon detecting that a new MCCH is configured on BCCH, a UE interested to receive one or more MBS services should acquire the MCCH, unless it knows that the services it is interested in are not provided by the corresponding xcast area.

A UE that is receiving an MBMS service via MRB may acquire the MCCH information from the start of each modification period. When service of interest change received service change, and such change translates into change of service types or service groups being received by the UE or translated into service types of service groups of interest to the UE, the UE may determine or may calculate a new common notification occasion (as discussed above, i.e., based on the MCCH with the shortest modification periods among all the modification periods of service of interest or being received by the UE); and the UE may acquire information from the start of each modification period according to the new modification period.

A UE that is interested to receive MBS from a carrier on which dl-Bandwidth included in MasterInformationBlock is set to n6 may acquire the MCCH information at least once every MCCH modification period. A UE that is not receiving an MBS service via MRB, as well as UEs that are receiving an MBS service via MRB but potentially interested to receive other services not started yet in another xcast area from a carrier on which dl-Bandwidth included in Master InformationBlock is other than n6, may verify that the stored MCCH information remains valid by attempting to find the MCCH information change notification at least notification-RepetitionCoeff times during the modification period of the applicable MCCH(s), if no MCCH information change notification is received.

NOTE 2: In case the UE is aware which MCCH(s) NR RAN uses for the service(s) it is interested to receive, the UE may only need to monitor change notifications for a subset of the MCCHs that are configured, referred to as the 'applicable MCCH(s)' in the above.

Figure 4B:
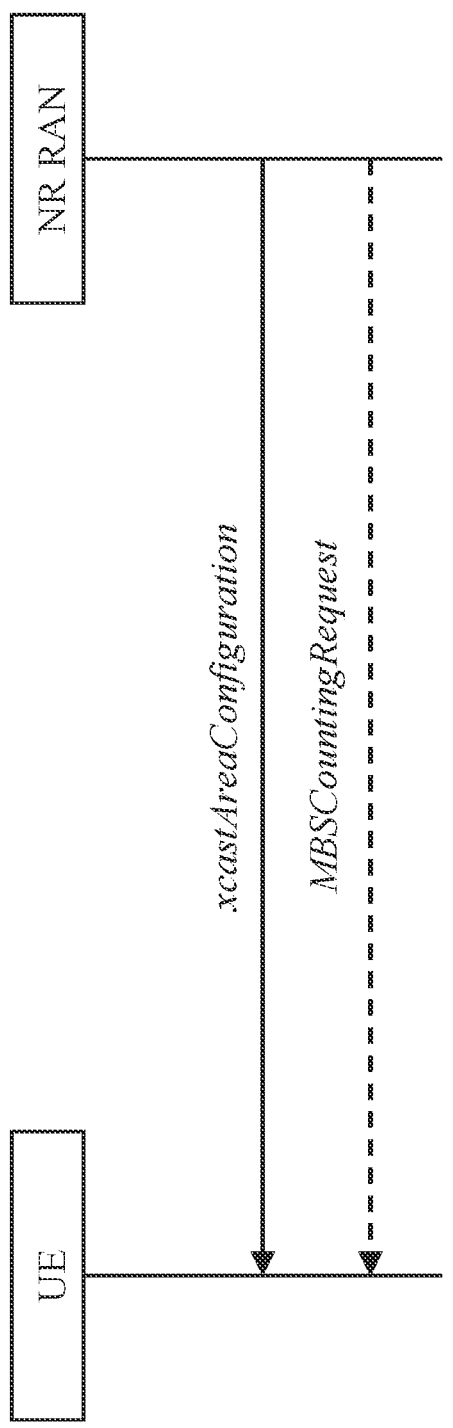
FIG. 4B illustrates MCCH information acquisition.

Aspects of MCCH information acquisition. See FIG. 4B. The UE may apply the MCCH information acquisition procedure to acquire the MBS control information that may be broadcasted by the NR RAN. The procedure may apply to MBS capable UEs that are in RRC_IDLE or in RRC_I-NACTIVE or in RRC_CONNECTED.

Initiation. A UE interested to receive MBS services may apply the MCCH information acquisition procedure upon entering the corresponding xcast area (e.g., upon power on, following UE mobility) and upon receiving a notification that the MCCH information has changed, upon switching to a different xcast BWP, either from a unicast BWP or from another xcast BWP. A UE that is receiving an MBS service may apply the MCCH information acquisition procedure to acquire the MCCH, that corresponds with the service that is being received, at the start of each modification period.

Unless explicitly stated otherwise in the procedural specification, the MCCH information acquisition procedure overwrites any stored MCCH information, i.e., delta configuration is not applicable for MCCH information and the UE discontinues using a field if it is absent in MCCH information, unless explicitly specified otherwise. Alternatively, delta configuration may be specified and may be applied for MCCH configuration.

MCCH information acquisition by the UE. Following is an MBS capable UE shall:

if the procedure is triggered by an MCCH information change notification:

start acquiring the xcastAreaConfiguration message and the MBSCountingRequest message if present, from the beginning of the modification period following the one in which the change notification was received;

NOTE 1: The UE continues using the previously received MCCH information until the new MCCH information has been acquired.

if the UE enters an Xcast area or UE configured with a different BWP:

acquire the xcastAreaConfiguration message and the MBSCountingRequest message if present, at the next repetition period;

if the UE is receiving an MBS service:

start acquiring the xcastAreaConfiguration message and the MBSCountingRequest message if present, that both concern the Xcast area of the service that is being received, from the beginning of each modification period;

Actions upon reception of the xcastAreaConfiguration message. No UE requirements related to the contents of this xcastAreaConfiguration apply other than those specified elsewhere, e.g., within procedures using the concerned system information, the corresponding field descriptions.

Actions upon reception of the MBSCountingRequest message. Upon receiving MBSCountingRequest message, the UE shall perform the MBS Counting procedure as specified below with respect to MBS PTM radio bearer configuration.

Aspects of MBS PTM radio bearer configuration. The MBS xcast PTM radio bearer configuration procedure may be used by the UE to configure xcast MC-PTM bearer upon starting and/or stopping to receive an MRB. The MC-PTM bearer configuration consist of SDAP, PDCP (if header compression is required), RLC, MAC, and the physical layer. The procedure applies to UEs interested to receive one or more MBS services. Note that in a case where the UE is unable to receive an MBS service due to capability limitations, upper layers may take appropriate action, e.g., terminate a lower priority unicast service.

Initiation. The UE may apply the MRB establishment procedure to start receiving a session of a service it has an interest in. The procedure may be initiated, e.g., upon start of the MBS session, upon (re-)entry of the corresponding xcast service area, upon becoming interested in the MBMS service, upon removal of UE capability limitations inhibiting reception of the concerned service, upon BWP switching, i.e., new bearer should be configured with configuration associated with this BWP (and the old bearer configuration should be released). It is possible that the new configuration may only be a physical layer related configuration The UE may apply the MRB release procedure to stop receiving a session. The procedure may be initiated, e.g., upon stop of the MBS session, upon leaving the corresponding xcast service area, upon losing interest in the MBS service, when capability limitations start inhibiting reception of the concerned service, upon BWP switching, i.e., the bearer configuration associated with the old BWP shall be released. Note it is possible that the released configuration may only be PHY related.

MRB establishment. Upon MRB establishment, the UE may:

establish the SDAP entity, if not already established for the MBMS QoS Flow;

establish an PDCP entity in accordance with the configuration specified in 38.331;

establish an RLC entity in accordance with the configuration specified in 38.331;

configure an MTCH logical channel in accordance with the received locgicalChannelIdentity, applicable for the MRB, as included in the xcastAreaConfiguration message;

If MBS services are over MCH, configure the physical layer in accordance with the pmch-Config, applicable for the MRB, as included in the xcastAreaConfiguration message;

If MBS services are over DL-SCH, configure the physical layer in accordance with the pdsch-Config, applicable for the MRB, as included in the xcastAreaConfiguration message; or inform upper layers about the establishment of the MRB by indicating the corresponding tmgi and sessionId.

MRB release. Upon MRB release, the UE may:

release the SDAP entity if there are no further mapped bearers for the 5G QoS flow, release the PDCP entity, the RLC entity as well as the related MAC and physical layer configuration;

inform upper layers about the release of the MRB by indicating the corresponding tmgi and sessionId.

Figure 4C:
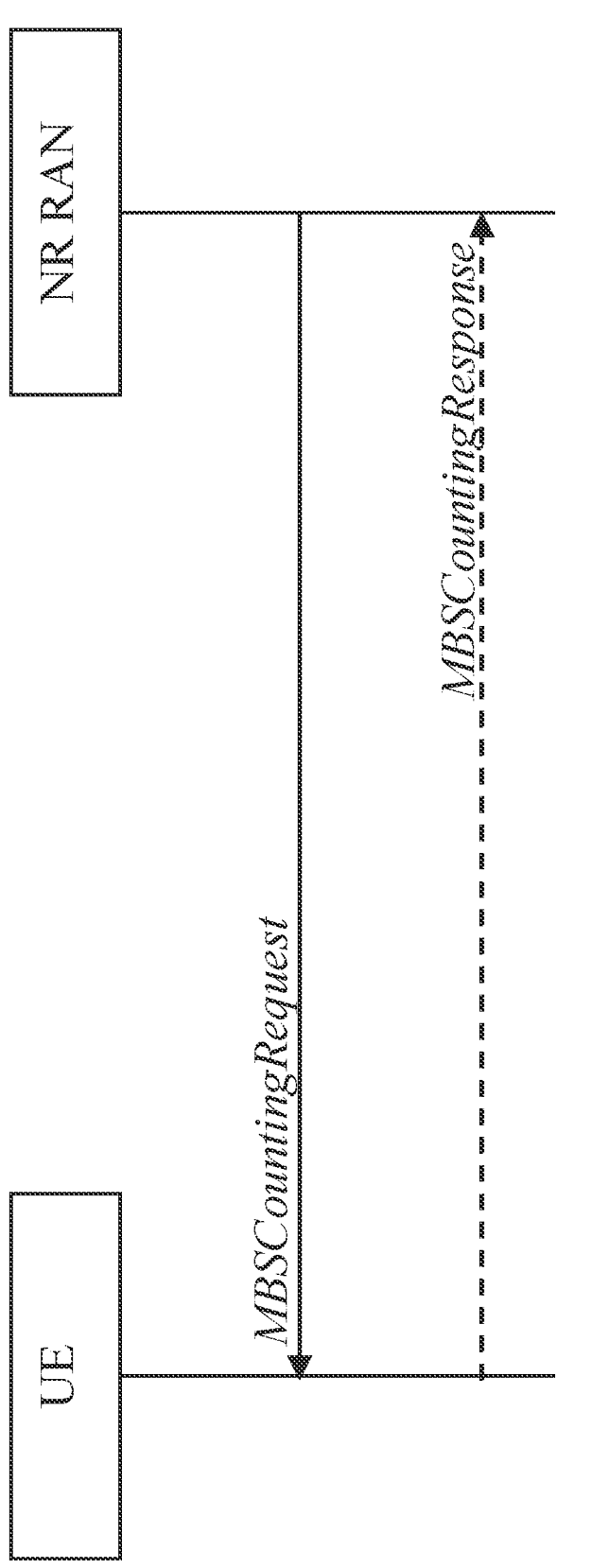
FIG. 4C illustrates MBS Counting procedure.

Aspects of MBS Counting Procedure. See FIG. 4C. The MBS Counting procedure may be used by the NR RAN to count the number of RRC_CONNECTED mode UEs which are receiving via an MRB or interested to receive via an MRB the specified MBS services. The UE may determine interest in an MBS service, that is identified by the TMGI, by interaction with upper layers. For a UE in RRC_INACTIVE, the RAN paging may indicate that the reason for paging is for MBS counting. Beside each UE paging occasions, the UEs may also be configured with a common paging occasion in support of paging for MBS counting request. UE interested in MBS service may monitor such paging occasion. In response to paging, for example, in RRC Resume request message or RRC Resume Request1 message from the UE, the UE may include the MBS Counting Response, for example in a container as a piggyback on the paging response message. Alternatively, the UE includes the contents that makes up the MBS counting response message into the paging response message Initiation. An NR RAN may initiate the procedure by sending an MBSCountingRequest message. Upon receiving the MBSCountingRequest message, if the UE is in RRC_IDLE or RRC_INACTIVE mode, it may transition to RRC_CONNECTED mode; if the UE is in in RRC_CONNECTED mode it may:

if the SystemInformationBlockType1, that provided the scheduling information for the systemInformationBlockTypeX that included the configuration of the MCCH via which the MBSCountingRequest message was received, contained the identity of the Registered PLMN; and if the UE is receiving via an MRB or interested to receive via an MRB at least one of the services in the received countingRequestList:

if more than one entry is included in the xcast-AreaInfoList received in the SystemInformationBlockTypeX that included the configuration of the MCCH via which the MBSCountingRequest message was received:

include the xcast-AreaIndex in the MBSCountingResponse message and set it to the index of the entry in the xcast-AreaInfoList within the received SystemInformationBlockTypeX that corresponds with the Xcast area used to transfer the received MBSCountingRequest message;

for each MBS service included in the received countingRequestList:

if the UE is receiving via an MRB or interested to receive via an MRB this MBS service:

include an entry in the countingResponseList within the MBSCountingResponse message with countingResponseService set it to the index of the entry in the countingRequestList within the received MBSCountingRequest that corresponds with the MBS service the UE is receiving or interested to receive;

submit the MBSCountingResponse message to lower layers for transmission upon which the procedure ends.

NOTE 1: UEs that are receiving an MBMS User Service, by means of a Unicast Bearer Service (i.e., via a DRB), but are interested to receive the concerned MBMS User Service, via an MBMS Bearer Service (i.e., via an MRB), may respond to the counting request.

NOTE 2: If ciphering is used at upper layers, the UE does not respond to the counting request, if it cannot decipher the MBMS service for which counting is performed.

NOTE 3: The UE may treat the MBSCountingRequest messages received in each modification period independently. In the unlikely case E-UTRAN would repeat an MBSCountingRequest (i.e., including the same services) in a subsequent modification period, the UE may respond again. The UE may provide at most one MBSCountingResponse message to multiple transmission attempts of an MBMSCountingRequest messages in a given modification period.

Figure 4D:
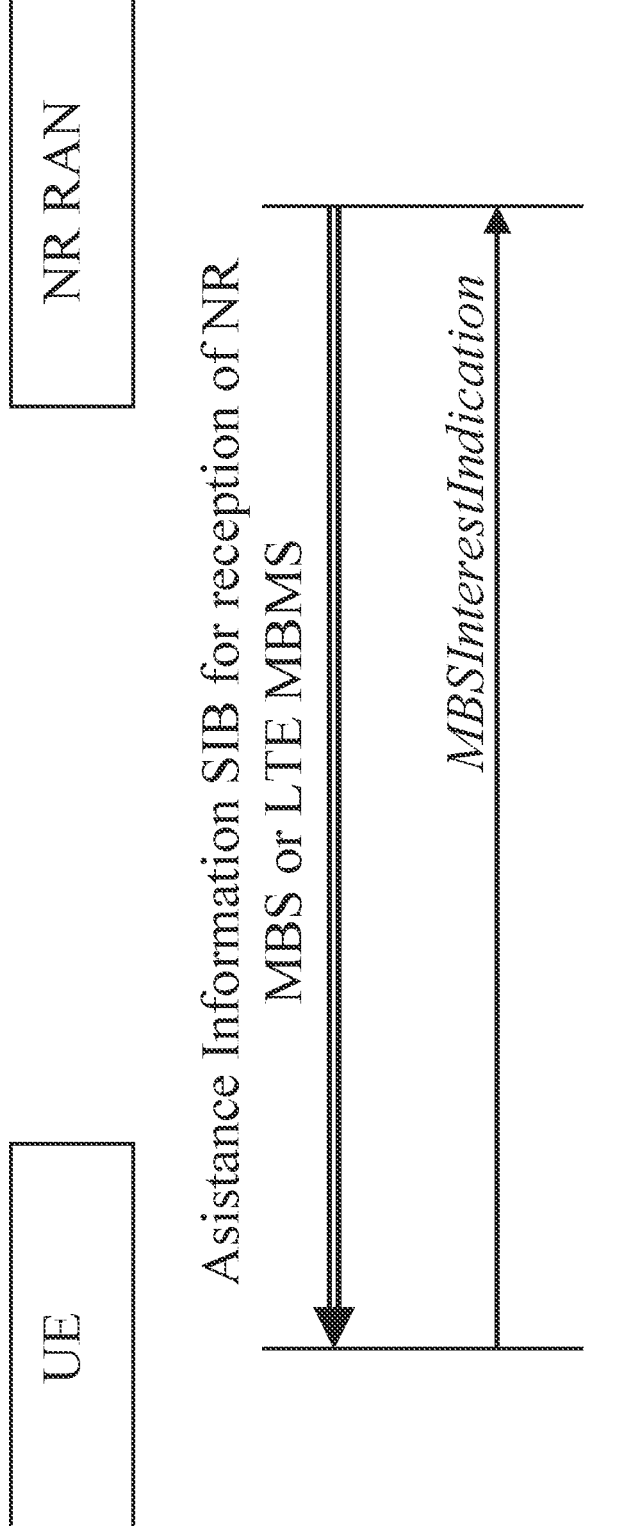
FIG. 4D illustrates MBS interest indication.

Aspects of MBS interest indication. See FIG. 4D. The purpose of this procedure is to inform NR RAN that the UE is receiving or is interested to receive MBS service(s) via an MRB or SC-MRB, and if so, to inform NR RAN about the priority of MBS versus unicast reception or MBS service(s) reception in receive only mode.

Initiation. An MBS or SC-PTM capable UE in RRC_CONNECTED may initiate the procedure in several cases including upon successful connection establishment, upon entering or leaving the service area, upon session start or stop, upon change of interest, upon change of priority between MBS reception and unicast reception, upon change to a PCell broadcasting assistance information SIB for reception of NR MBS or reception of LTE MBMS, upon starting and stopping of MBS service(s) in receive only mode, upon change of receive only mode frequency, bandwidth or subcarrier spacing of MBS service(s) in receive only mode, upon BWP switching.

Upon initiating the procedure, the UE may:

if assistance information SIB for reception of NR MBS or reception of LTE MBMS is broadcast by the PCell; or if mbs-ROM-ServiceIndication is received in system information from PCell:

ensure having a valid version of assistance information SIB for reception of NR MBS or reception of LTE MBMS for the PCell, if present;

if the UE did not transmit an MBSInterestIndication message since last entering RRC_CONNECTED state; or if since the last time the UE transmitted an MBSInterestIndication message, the UE connected to a PCell neither broadcasting assistance information SIB for reception of NR MBS or reception of LTE MBMS nor including mbs-ROM-ServiceIndication in system information from PCell:

if the set of MBS frequencies of interest, determined in accordance with procedure A, is not empty:

initiate transmission of the MBSInterestIndication message in accordance with procedure C;

else:

if the set of MBS frequencies of interest, determined in accordance with procedure A, has changed since the last transmission of the MBSInterestIndication message; or if at least one of the subcarrier spacing or bandwidth parameter of receive only mode MBS frequency of interest, determined in accordance with procedure A, has changed since the last transmission of the MBSInterestIndication message; or if the prioritisation of reception of all indicated MBS frequencies compared to reception of any of the established unicast bearers has changed since the last transmission of the MBSInterestIndication message:

initiate transmission of the MBSInterestIndication message in accordance with procedure C;

NOTE: The UE may send an MBSInterestIndication even when it is able to receive the MBS services it is interested in, i.e., to avoid that the network allocates a configuration inhibiting MBS reception.

else if system information that contains the information required to acquire the control information associated with transmission of MBS using SC-PTM is broadcast by the PCell:

if since the last time the UE transmitted an MBSInterestIndication message, the UE connected to a PCell not broadcasting system information that contains the information required to acquire the control information associated with transmission of MBS using SC-PTM; or if the set of MBS services of interest determined in accordance with procedure B is different from mbs-Services included in the last transmission of the MBSInterestIndication message; initiate the transmission of the MBSInterestIndication message in accordance with procedure C.

Determine MBS frequencies of interest (referred to herein as procedure A). The UE may:

consider a frequency to be part of the MBS frequencies of interest if the following conditions are met:

at least one MBS session the UE is receiving or interested to receive via an MRB or SC-MRB is ongoing or about to start; and NOTE 1: The UE may determine whether the session is ongoing from the start and stop time indicated in the User Service Description (USD).

for at least one of these MBS sessions either assistance information SIB for reception of NR MBS or reception of LTE MBMS acquired from the PCell includes for the concerned frequency one or more MBS SAIs as indicated in the USD for this session or this session is in receive only mode; and NOTE 2: The UE considers a frequency to be part of the MBS frequencies of interest even though NR RAN may (temporarily) not employ an MRB or SC-MRB for the concerned session. I.e. the UE does not verify if the session is indicated on (SC-)MCCH NOTE 3: The UE considers the frequencies of interest independently of any synchronization state 1.

the UE is capable of simultaneously receiving MRBs and/or is capable of simultaneously receiving SC-MRBs on the set of MBS frequencies of interest, regardless of whether a serving cell is configured on each of these frequencies or not; and the supportedBandCombination the UE included in UE-EUTRA-Capability or UE NR RAN capability contains at least one band combination including the set of MBS frequencies of interest; and the BWP(s) included in the assistance information SIB for reception of NR MBS or reception of LTE MBMS acquired from the PCell includes for the concerned frequency one or more BWP(s) configured into the UE for MBS reception; Note: This last condition only applies for reception of MBS service on an NR cell.

NOTE 4: Indicating a frequency implies that the UE supports system information that contains the information required to acquire the MBS control information associated with one or more xcast area or system information that contains the information required to acquire the control information associated with transmission of MBS using SC-PTM acquisition for the concerned frequency i.e. the indication should be independent of whether a serving cell is configured on that frequency.

NOTE 5: When evaluating which frequencies it can receive simultaneously, the UE does not take into account the serving frequencies that are currently configured i.e. it only considers MMS frequencies it is interested to receive.

NOTE 6: The set of MBS frequencies of interest includes at most one frequency for a given physical frequency. The UE only considers a physical frequency to be part of the MBS frequencies of interest if it supports at least one of the bands indicated for this physical frequency in SystemInformationBlockType1 (for serving frequency) or assistance information SIB for reception of NR MBS or reception of LTE MBMS (for neighbouring frequencies). In this case, NR RAN may assume the UE supports MBS reception on any of the bands supported by the UE (i.e. according to supportedBandCombination).

Determine MBS services of interest (referred to herein as procedure B). The UE may:

consider a MBS service to be part of the MBS services of interest if the following conditions are met:

the UE is SC-PTM capable; and the UE is receiving or interested to receive this service via an SC-MRB; and one session of this service is ongoing or about to start; and one or more MBS SAIs in the USD for this service is included in assistance information SIB for reception of NR MBS or reception of LTE MBMS acquired from the PCell for a frequency belonging to the set of MBMS frequencies of interest, determined according to procedure A.

Actions related to transmission of MBSInterestIndication message (referred to herein as procedure C). The UE may set the contents of the MBSInterestIndication message as follows:

if the set of MBS frequencies of interest, determined in accordance with procedure A, is not empty:

include mbs-FreqList and set it to include the MBS frequencies of interest sorted by decreasing order of interest, using the EARFCN corresponding with freqBandIndicator included in SystemInformation-BlockType1 (for serving frequency), if applicable, and the EARFCN(s) as included in system information that contains the information required to acquire the control information associated with transmission of MBS using SC-PTM (for neighbouring frequencies);

NOTE 1: The EARFCN included in mbs-FreqList is merely used to indicate a physical frequency the UE is interested to receive i.e. the UE may not support the band corresponding to the included EARFCN (but it does support at least one of the bands indicated in system information for the concerned physical frequency).

include mbs-Priority if the UE prioritises reception of all indicated MBS frequencies above reception of any of the unicast bearers;

if system information that contains the information required to acquire the control information associated with transmission of MBS using SC-PTM is broadcast by the PCell:

include mbs-Services and set it to indicate the set of MBS services of interest determined in accordance with procedure B;

NOTE 2: If the UE prioritises MBS reception and unicast data cannot be supported because of congestion on the MBS carrier(s), NR RAN may initiate release of unicast bearers. It is up to NR RAN implementation whether all bearers or only GBR bearers are released. NR RAN does not initiate re-establishment of the released unicast bearers upon alleviation of the congestion.

if the UE is receiving MBS service(s) in receive only mode:

if the supportedBandCombination the UE included in UE-EUTRA-Capability contains at least one band combination including the mms-ROM-Freq:

include mbs-ROM-Freq, mbs-ROM-SubcarrierSpacing and mms-Bandwidth;

NOTE 3: The EARFCN included in mbs-ROM-Freq is used to indicate a physical frequency the UE is interested to receive MBS service(s) in receive only mode and is determined based on UE implementation.

The UE shall submit the MBSInterestIndication message to lower layers for transmission.

SC-PTM. SC-PTM control information is provided on a specific logical channel: the SC-MCCH. The SC-MCCH carries the SCPTMConfiguration (or XcastAreaConfiguration) message which indicates the MBS sessions that are ongoing as well as the (corresponding) information on when each session may be scheduled, i.e. scheduling period, scheduling window and start offset. The SCPTMConfiguration message also provides information about the neighbor cells transmitting the MBS sessions which are ongoing on the current cell. A limited amount of SC-PTM control information is provided on the BCCH or BR-BCCH. This primarily concerns the information needed to acquire the SC-MCCH.

Aspects of SC-MCCH scheduling. The SC-MCCH information (i.e., information transmitted in messages sent over SC-MCCH) is transmitted periodically, using a configurable repetition period. SC-MCCH transmissions (and the associated radio resources and MCS) are indicated on PDCCH.

Aspects of SC-MCCH information validity and notification of changes. Change of SC-MCCH information may only occur at specific radio frames, i.e., the concept of a modification period is used. Within a modification period, the same SC-MCCH information may be transmitted a number of times, as defined by its scheduling (which is based on a repetition period). The modification period boundaries are defined by SFN values for which SFN mod m=0, where m is the number of radio frames comprising the modification period. The modification period is configured by means of SystemInformationBlockTypeX. If H-SFN is provided in SystemInformationBlockType1-BR, modification period boundaries for BL UEs or UEs in CE are defined by SFN values for which (H-SFN*1024+SFN) mod m=0. The modification period boundaries for NB-IoT UEs are defined by SFN values for which (H-SFN*1024+SFN) mod m=0.

When the network changes (some of) the SC-MCCH information, it notifies the UEs, other than BL UEs, UEs in CE or NB-IoT UEs, about the change in the first subframe which can be used for SC-MCCH transmission in a repetition period. LSB bit in 8-bit bitmap when set to '1' indicates the change in SC-MCCH. Upon receiving a change notification, a UE interested to receive MBMS services transmitted using SC-PTM acquires the new SC-MCCH information starting from the same subframe. The UE applies the previously acquired SC-MCCH information until the UE acquires the new SC-MCCH information. The change notification may be indicated at the granularity of an Xcast area. Alternatively, the change notification may be indicated at the granularity of MBS service or group of service level within an Xcast area.

When the network changes (some of) the SC-MCCH information for start of new MBMS service(s) transmitted using SC-PTM, it notifies BL UEs, UEs in CE or NB-IoT UEs about the change in every PDCCH which schedules the first SC-MCCH in a repetition period in the current modification period. The notification is transmitted with 1 bit. The bit, when set to '1', indicates the start of new MBS service (s). Upon receiving a change notification, a BL UE, UE in CE or NB-IoT UE interested to receive MBS services transmitted using SC-PTM acquires the new SC-MCCH information scheduled by the PDCCH. The BL UE, UE in CE or NB-IoT UE applies the previously acquired SC-MCCH information until the BL UE, UE in CE or NB-IoT UE acquires the new SC-MCCH information.

When the network changes SC-MTCH specific information e.g. start of new MBS service(s) transmitted using SC-PTM or change of ongoing MBS service(s) transmitted using SC-PTM, it notifies the BL UEs, UEs in CE or NB-IoT UEs in the PDCCH which schedules the SC-MTCH in the current modification period. The notification is transmitted with a 2 bit bitmap. The LSB in the 2-bit bitmap, when set to '1', indicates the change of the on-going MBMS service and the MSB in the 2-bit bitmap, when set to '1', indicates the start of new MBMS service(s). In the case the network changes an on-going SC-MTCH transmission in the next modification period, it notifies the BL UEs, UEs in CE or NB-IoT UEs in the PDCCH which schedules this SC-MTCH in the current modification period. In the case the network starts new MBS service(s) transmitted using SC-PTM, the network notifies the UEs which have on-going SC-MTCH in the PDCCH scheduling each of the SC-MTCH. Upon receiving such notification, a BL UE, UE in CE or NB-IoT UE acquires the new SC-MCCH information at the start of the next modification period. The BL UE, UE in CE or NB-IoT UE applies the previously acquired SC-MCCH information until the BL UE, UE in CE or NB-IoT UE acquires the new SC-MCCH information.

Procedures. The SC-PTM capable UE receiving or interested to receive MBS service(s) via SC-MRB applies SC-PTM procedures.

Figure 4E:
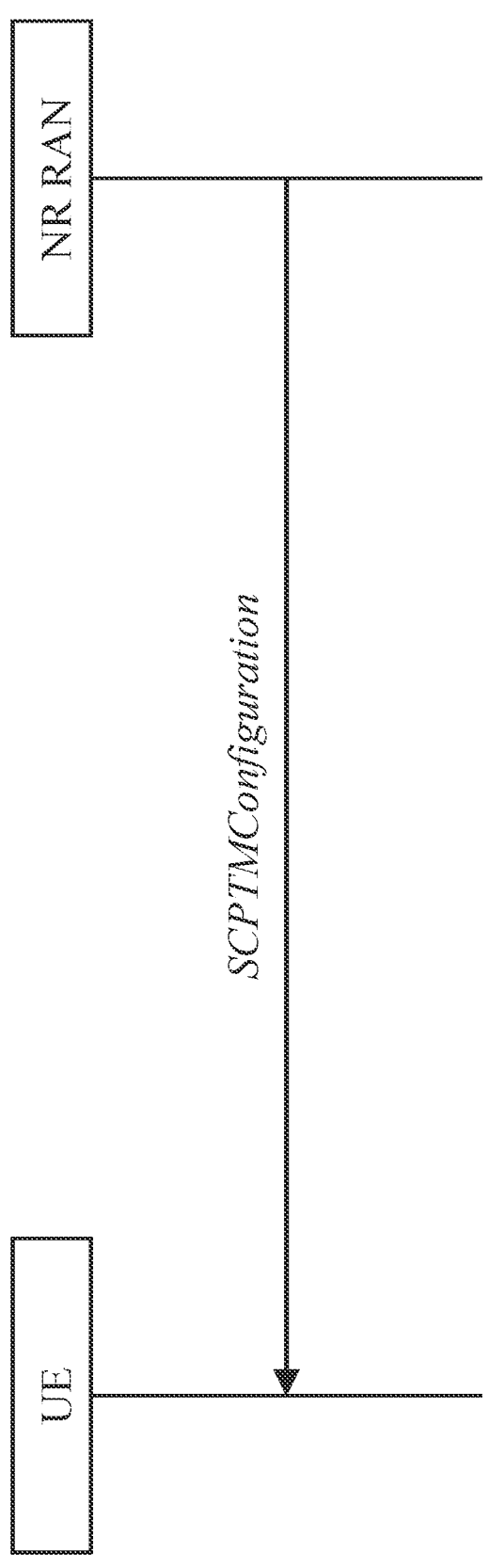
FIG. 4E illustrates SC-MCCH information acquisition.

Aspects of SC-MCCH information acquisition. See FIG. 4E. The UE applies the SC-MCCH information acquisition procedure to acquire the SC-PTM control information that is broadcast by the NR RAN. The procedure applies to SC-PTM capable UEs that are in RRC_IDLE and RRC_INACTIVE except for BL UEs, UEs in CE and NB-IoT UEs, performing EDT procedure. This procedure also applies to SC-PTM capable UEs that are in RRC_CONNECTED except for BL UEs, UEs in CE or NB-IoT UEs.

Initiation. A UE interested to receive MBS services via SC-MRB shall apply the SC-MCCH information acquisition procedure upon entering the cell broadcasting SystemInformationBlockTypeX (SystemInformationBlockTypeX-NB in NB-IoT) (e.g. upon power on, following UE mobility, following BWP change) and upon receiving a notification that the SC-MCCH information has changed. A UE, except for BL UE, UE in CE or NB-IoT UE, that is receiving an MBS service via SC-MRB shall apply the SC-MCCH information acquisition procedure to acquire the SC-MCCH information that corresponds with the service that is being received, at the start of each modification period. The BL UE, UE in CE or NB-IoT UE that is receiving an MBMS service via SC-MRB shall apply the SC-MCCH information acquisition procedure upon receiving a notification that the SC-MCCH information that corresponds with the service that is being received is about to be changed. The BL UE, UE in CE or NB-IoT UE that is receiving an MBS service via SC-MRB may apply the SC-MCCH information acquisition procedure upon receiving a notification that the SC-MCCH information is about to be changed due to start of a new service.

Unless explicitly stated otherwise in the procedural specification, the SC-MCCH information acquisition procedure overwrites any stored SC-MCCH information, i.e. delta configuration is not applicable for SC-MCCH information and the UE discontinues using a field if it is absent in SC-MCCH information unless explicitly specified otherwise. Alternatively, delta configuration might be specified and applied for MCCH configuration SC-MCCH information acquisition by the UE. A SC-PTM capable UE may:

if the procedure is triggered by an SC-MCCH information change notification and the UE has no ongoing MBS service:
  except for a BL UE, UE in CE or NB-IoT UE, start acquiring the SCPTMConfiguration message from the subframe in which the change notification was received;
  for a BL UE, UE in CE or NB-IoT UE, acquire the SCPTMConfiguration message scheduled by the PDCCH in which the change notification was received;
NOTE 1: The UE continues using the previously received SC-MCCH information until the new SC-MCCH information has been acquired.
if the UE enters a cell broadcasting SystemInformationBlockTypeX (SystemInformationBlockTypeX-NB in NB-IoT):
  acquire the SCPTMConfiguration message at the next repetition period;
if the UE is receiving an MBS service via an SC-MRB:
  except for BL UE, UE in CE or NB-IoT UE, start acquiring the SCPTMConfiguration message from the beginning of each modification period;

a BL UE, UE in CE or NB-IoT UE shall start acquiring the SCPTMConfiguration message at the start of the next modification period upon receiving a notification that the SC-MCCH information that corresponds with the service that is being received is about to be changed;
  a BL UE, UE in CE or NB-IoT UE may start acquiring the SCPTMConfiguration message at the start of the next modification period upon receiving a notification that the SC-MCCH information is about to be changed due to start of a new service;

Actions upon reception of the SCPTMConfiguration message. No UE requirements related to the contents of this SCPTMConfiguration apply other than those specified elsewhere e.g. within procedures using the concerned system information, the corresponding field descriptions.

Aspects of SC-PTM radio bearer configuration. The SC-PTM radio bearer configuration procedure may be used by the UE to configure SDAP, PDCP, RLC, MAC and the physical layer upon starting and/or stopping to receive an SC-MRB transmitted on SC-MTCH. The procedure applies to SC-PTM capable UEs that are in RRC_IDLE or RRC_INACTIVE and to SC-PTM capable UEs that are not BL UEs, UEs in CE or NB-IoT UEs in RRC_CONNECTED, and are interested to receive one or more MBS services via SC-MRB. Note that in case where the UE is unable to receive an MBS service via an SC-MRB due to capability limitations, upper layers may take appropriate action e.g. terminate a lower priority unicast service.

Initiation. The UE may apply the SC-MRB establishment procedure to start receiving a session of a MBS service it has an interest in. The procedure may be initiated e.g. upon start of the MBS session, upon entering a cell providing via SC-MRB a MBS service in which the UE has interest, upon becoming interested in the MBS service, upon removal of UE capability limitations inhibiting reception of the concerned service, or upon BWP switch.

The UE may apply the SC-MRB release procedure to stop receiving a session. The procedure may be initiated e.g. upon stop of the MBS session, upon leaving the cell where a SC-MRB is established, upon losing interest in the MBS service, when capability limitations start inhibiting reception of the concerned service or upon BWP switch.

SC-MRB establishment. Upon SC-MRB establishment, the UE may:
  establish the SDAP entity, if not already established for the MBMS QoS Flow;
  establish an PDCP entity in accordance with the configuration specified in 38.331;
  establish an RLC entity in accordance with the configuration specified in 38.331;
  configure a SC-MTCH logical channel applicable for the SC-MRB and instruct MAC to receive DL-SCH on the cell where the SCPTMConfiguration message was received for the MBS service for which the SC-MRB is established and using g-RNTI and sc-mtch-SchedulingInfo (if included) in this message for this MBS service;
  configure the physical layer in accordance with the sc-mtch-InfoList, applicable for the SC-MRB, as included in the SCPTMConfiguration message;
  inform upper layers about the establishment of the SC-MRB by indicating the corresponding tmgi and sessionId.
SC-MRB release. Upon SC-MRB release, the UE may:
  release the SDAP entity if there are no further mapped bearers for the 5G QoS flow, release the PDCP entity, the RLC entity as well as the related MAC and physical layer configuration;

inform upper layers about the release of the SC-MRB by indicating the corresponding tmgi and sessionId;

What is claimed is:

1. A method implemented by a wireless transmit/receive unit (WTRU), the method comprising:

receiving, from a single cell, multicast control channel (MCCH) configuration information for a plurality of multicast-broadcast services (MBS) services, wherein the MCCH configuration information indicates a first MBS service mapped to a first MCCH logical channel associated with a first reception resource, and a second MBS service mapped to a second MCCH logical channel associated with a second reception resource, wherein the first MCCH logical channel and the second MCCH logical channel are from the single cell;

determining, based on a service associated with the WTRU, to receive the first MBS service;

receiving, based on the determination to receive the first MBS service, the first MCCH logical channel; and receiving, based on the reception of the first MCCH logical channel, the first MBS service.

2. The method of claim 1, wherein the first MCCH logical channel is associated with a first reception resource, the second MCCH logical channel is associated with a second reception resource, and the first MCCH logical channel is received based on monitoring the first reception resource.

3. The method of claim 1, further comprising receiving MBS control information from the first MCCH logical channel and configuring, based on the MBS control information, one or more of a service data adaptation protocol (SDAP) entity, a packet data convergence protocol (PDCP) entity, and a radio link control (RLC) entity.

4. The method of claim 3, wherein the MBS control information comprises MBS scheduling information, MBS session information, a sub-carrier spacing (SCS), a bandwidth part (BWP), repetition information, a discontinuous reception (DRX) configuration, a carrier frequency, a packet data convergence protocol (PDCP) configuration, a radio link control (RLC) configuration, a media access control (MAC) configuration, a logical channel configuration, a neighbour cell list, or a radio network temporary identifier (RNTI).

5. The method of claim 1, further comprising sending an MBS interest indication associated with the MBS services.

6. The method of claim 5, wherein the MBS interest indication comprises a bandwidth part (BWP) of a broadcast service.

7. The method of claim 1, wherein the MCCH configuration information comprises change notification information, the method further comprising:

determining, based on the change notification information, one or more common change notification occasions; and determining, based on the one or more common change notification occasions, a change associated with the first MBS service, wherein the first MBS service is received based on the change associated with the first MBS service.

8. The method of claim 7, wherein the change notification information comprises: (a) a modification period associated with each of a plurality of MCCH logical channels and the common change notification is determined based on an MCCH logical channel with a shortest modification period, or (b) an MBS service of interest and the common change notification is determined based on a change associated with the MBS service of interest, or (c) a service type and the common change notification is determined based on a change associated with the service type.

9. The method of claim 7, wherein the change comprises: (a) a change of a service type associated with the first MBS service, or (b) a change of an MBS service of interest associated with the first MBS service.

10. The method of claim 1, further comprising determining an MBS frequency of interest based on a bandwidth part (BWP) configuration of the first MBS service.

11. The method of claim 1, wherein the MCCH configuration information comprises MCCH scheduling information, a sub-carrier spacing (SCS), a bandwidth part (BWP), an MCCH change notification indicator, a carrier frequency, a packet data convergence protocol (PDCP) configuration, a radio link control (RLC) configuration, a media access control (MAC) configuration, a discontinuous reception (DRX) configuration, or a logical channel configuration.

12. The method of claim 1, wherein the MCCH configuration information is included in a system information block (SIB).

13. The method of claim 1, wherein receiving the MCCH configuration information comprises receiving a multicast broadcast service radio network temporary identifier (M-RNTI) on a physical downlink control channel (PDCCH).

14. The method of claim 1, wherein the MCCH configuration information comprises one or more change notification configuration parameter sets.

15. The method of claim 14, wherein each of the one or more change notification configuration parameter sets includes an MCCH modification cycle and an MCCH repetition cycle.

16. A wireless transmit/receive unit (WTRU) comprising circuitry including a transmitter, a receiver, a processor and memory, and configured to:

receive, from a single cell, multicast control channel (MCCH) configuration information for a plurality of multicast-broadcast services (MBS) services, wherein the MCCH configuration information indicates a first MBS service mapped to a first MCCH logical channel associated with a first reception resource, and a second MBS service mapped to a second MCCH logical channel associated with a second reception resource, wherein the first MCCH logical channel and the second MCCH logical channel are from the single cell;

determine, based on a service associated with the WTRU, to receive the first MBS service;

receive, based on the determination to receive the first MBS service, the first MCCH logical channel; and receive, based on the reception of the first MCCH logical channel, the first MBS service.

17. The WTRU of claim 16, wherein the first MCCH logical channel is associated with a first reception resource, the second MCCH logical channel is associated with a second reception resource, and the first MCCH logical channel is received based on monitoring the first reception resource.

18. The WTRU of claim 16, configured to receive MBS control information from the first MCCH logical channel and configuring, based on the MBS control information, one or more of a service data adaptation protocol (SDAP) entity, a packet data convergence protocol (PDCP) entity, and a radio link control (RLC) entity.

19. The WTRU of claim 16, wherein the MBS control information comprises MBS scheduling information, MBS session information, a sub-carrier spacing (SCS), a bandwidth part (BWP), repetition information, a discontinuous reception (DRX) configuration, a carrier frequency, a packet data convergence protocol (PDCP) configuration, a radio link control (RLC) configuration, a media access control (MAC) configuration, a logical channel configuration, a neighbor cell list, or a radio network temporary identifier (RNTI).

20. The WTRU of claim 16, further comprising sending an MBS interest indication associated with the MBS services.

* * * * *